(12) United States Patent
Tashiro et al.

(10) Patent No.: US 12,425,077 B2
(45) Date of Patent: Sep. 23, 2025

(54) MASSIVE MIMO FOR HAPS BASED ON ANGLE INFORMATION ON USER APPARATUS

(71) Applicant: SoftBank Corp., Tokyo (JP)

(72) Inventors: Koji Tashiro, Tokyo (JP); Mitsukuni Konishi, Tokyo (JP); Kenji Hoshino, Tokyo (JP); Yoshichika Ota, Tokyo (JP); Atsushi Nagate, Tokyo (JP)

(73) Assignee: SoftBank Corp., Tokyo (JP)

( * ) Notice: Subject to any disclaimer, the term of this patent is extended or adjusted under 35 U.S.C. 154(b) by 317 days.

(21) Appl. No.: 18/264,778

(22) PCT Filed: Jan. 12, 2022

(86) PCT No.: PCT/JP2022/000757
§ 371 (c)(1),
(2) Date: Aug. 9, 2023

(87) PCT Pub. No.: WO2022/172675
PCT Pub. Date: Aug. 18, 2022

(65) Prior Publication Data
US 2024/0056136 A1 Feb. 15, 2024

(30) Foreign Application Priority Data
Feb. 12, 2021 (JP) .................................. 2021-021330

(51) Int. Cl.
*H04B 7/0452* (2017.01)
*H04B 7/185* (2006.01)
*H04W 72/541* (2023.01)

(52) U.S. Cl.
CPC ....... *H04B 7/0452* (2013.01); *H04B 7/18504* (2013.01); *H04B 7/18539* (2013.01); *H04W 72/541* (2023.01)

(58) Field of Classification Search
CPC .............. H04B 7/0452; H04B 7/18504; H04B 7/18539; H04B 7/0617; H04W 72/541; H04W 16/28; H04W 72/046; H04W 84/06
See application file for complete search history.

(56) References Cited

U.S. PATENT DOCUMENTS

| 11,831,393 B2 | 11/2023 | Gao et al. |
| 2014/0192761 A1 | 7/2014 | Inoue et al. |

(Continued)

FOREIGN PATENT DOCUMENTS

| CN | 1337101 A | 2/2002 |
| CN | 103733553 A | 4/2014 |

(Continued)

OTHER PUBLICATIONS

Machine Translation of CN 109587706 B (Year: 2017).*
(Continued)

*Primary Examiner* — Hashim S Bhatti
*Assistant Examiner* — Noah James Sugden
(74) *Attorney, Agent, or Firm* — Westborough IP Group, LLC

(57) ABSTRACT

In an upper-airspace staying type communication relay apparatus that performs an MU-MIMO radio communication with plural terminal apparatuses located in a cell, it is intended to improve the communication quality of the entire cell and enhance the system capacity, while suppressing an increase in overhead in the terminal apparatus and the communication relay apparatus even if the number of terminal apparatuses located in the cell increases. The communication relay apparatus receives an uplink signal from each of plural terminal apparatuses via an array antenna, estimates angle information indicating a direction of the terminal apparatus for each of the plural terminal appara- (Continued)

tuses, selects a terminal apparatus to be assigned to each of plural radio resources used for a downlink based on the estimation result of the angle information, calculates a downlink beamforming weight based on the estimation result of the angle information, and transmits a downlink signal to the terminal apparatus via the array antenna based on the beamforming weight corresponding to the terminal apparatus and the radio resources assigned to the terminal apparatus.

8 Claims, 18 Drawing Sheets

(56) References Cited

U.S. PATENT DOCUMENTS

| | | | |
|---|---|---|---|
| 2015/0207549 A1 | 7/2015 | Nagata et al. | |
| 2016/0046387 A1 | 2/2016 | Frolov et al. | |
| 2019/0058513 A1 | 2/2019 | Mizusawa | |
| 2023/0291444 A1* | 9/2023 | Nammi | H04B 7/063 |
| 2023/0335888 A1* | 10/2023 | Sudo | H01Q 19/021 |
| 2023/0353247 A1* | 11/2023 | Lee | H04B 10/503 |

FOREIGN PATENT DOCUMENTS

| | | | | |
|---|---|---|---|---|
| CN | 110518961 A | | 11/2019 | |
| CN | 109587706 B | * | 4/2022 | ............ H04W 24/08 |
| EP | 1 146 665 A1 | | 10/2001 | |
| EP | 2 747 327 A1 | | 6/2014 | |
| EP | 2 882 123 A1 | | 6/2015 | |
| EP | 3 439 257 A1 | | 2/2019 | |
| EP | 3 836 421 A1 | | 6/2021 | |
| JP | 2006-041562 A | | 2/2006 | |
| JP | 2013-42340 A | | 2/2013 | |
| JP | 2014-27608 A | | 2/2014 | |
| JP | 2017-184000 A | | 10/2017 | |
| JP | 2020-036100 A | | 3/2020 | |
| KR | 2001-0101556 | | 11/2001 | |

OTHER PUBLICATIONS

European Search Report, Dated Jul. 15, 2024.
Li You, et al., "Massive MIMO Transmission for LEO Satellite Communications", IEEE Journal on Selected Areas in Communications vol. 38, No. 8 (Jun. 6, 2020) pp. 1851-1865.
Zhuxian Lian, et al., "User Grouping and Beamforming for HAP Massive MIMO Systems Based on Statistical-Eigenmode", IEEE Wireless Communications Letters, vol. 8, No. 3 (Jun. 1, 2019) pp. 961-964.
Asil Koc, et al., "3D Angular-Based Hybrid Precoding and User Grouping for Uniform Rectangular Arrays in Massive MU-MIMO Systems", IEEE Access vol. 8 (May 5, 2020) pp. 84689-84712.
Notice of Reasons for Refusal for Japanese Application No. 2021-021330, Dated Oct. 25, 2023 and English tranlation thereof.
PCT Application No. PCT/JP2022/000757 filed Jan. 12, 2022, International Search Report and Written Opinion Dated Apr. 5, 2022.
Zhuxian Lian, et al., "User Grouping and Beamforming for HAP Massive MIMO Systems Based on Statistical-Eigenmode", IEEE Wireless Communications Letters, vol. 8, Issue 3, pp. 961-964, Jun. 2019.
International Preliminary Report on Patentability, Dated Aug. 15, 2023.
European Office Action, Dated Jan. 23, 2025.
European Office Action, Dated Jul. 26, 2024.
Decision to Grant a Patent, Dated Mar. 5, 2024.

* cited by examiner

MASSIVE MIMO FOR HAPS BASED ON ANGLE INFORMATION ON USER APPARATUS

TECHNICAL FIELD

The present invention relates to MU (multi user)-MIMO (multiple-input multiple-output) technology between plural terminal apparatuses located in a cell of a service area formed by an aerial-staying type communication relay apparatus such as a HAPS in an upper airspace.

BACKGROUND ART

There is conventionally known an aerial-staying type communication relay apparatus such as a high altitude platform station (HAPS) (also referred to as "high altitude pseudo satellite") that can float and stay in an airspace (for example, see Patent Literature 1). There is known a communication of massive MIMO (hereinafter also referred to as "mMIMO") transmission method, as a communication between an aerial-staying type communication relay apparatus such as a HAPS and plural terminal apparatuses (hereinafter also referred to as "UE") located in a cell formed by the aerial-staying type communication relay apparatus. The mMIMO is a radio transmission technology that realizes a high-capacity and high-speed communication by transmitting and receiving data using an array antenna having a large number of antenna elements. A transmission method that simultaneously performs a beamforming for each of the plural UEs is also called "MU (Multi User)-MIMO". By performing the MU-MIMO transmission using multi-element array antenna, a communication can be performed by directing an appropriate beam for each UE according to a communication environment of each UE, so the communication quality of the entire cell can be improved. Furthermore, since a communication with plural UEs can be performed using a same radio resource (time/frequency resource), a system capacity can be enhanced.

CITATION LIST

Patent Literature

Patent Literature 1: U.S. Patent Application Publication No. 2016/0046387.

Non-Patent Literature

Non-Patent Literature 1: Z Lian, L Jiang, C He, D He, "User grouping and beamforming for HAP massive MIMO systems based on statistical-Eigenmode", IEEE Wireless Communications Letters, Volume 8, Issue 3, pp. 961-964 (June 2019).

SUMMARY OF INVENTION

Technical Problem

In case that the aerial-staying type communication relay apparatus performs an MU-MIMO communication with plural UEs using a multi-element array antenna, it is necessary to periodically obtain CSI (channel state information) between the communication relay apparatus and the UE) of each UE in order to direct an appropriate beam for each UE. The communication quality varies greatly depending on which UE is assigned to a certain radio resource (time/frequency resource). For example, in case that the same frequency resource is assigned to plural UEs that are close to each other in spatial distance, the respective beams to the UEs interfere with each other, resulting in a significant deterioration in communication quality. In order to prevent this deterioration in communication quality, it is necessary to appropriately select UEs to be assigned to the same radio resource (time/frequency resource), and for this UE selection it is also necessary to periodically obtain the CSI of each UE. However, in order to obtain the CSI of each UE, it is necessary to frequently transmit a reference signal (for example, SRS: Sounding Reference Signal) from all UEs in the cell to the communication relay apparatus in the upper airspace, and there is a problem that the overhead increases in each UE and the communication relay apparatus.

In Non-Patent Literature 1, in a HAP (high altitude platform) system that performs a MU-MIMO transmission using a multi-element array antenna, with respect to each UE located in a cell, it is proposed to repeatedly evaluate a CD (Chordal Distance), which is an index of channel orthogonality between UEs, and perform a UE selection (grouping) and a beamforming based on the CD evaluation result. However, it is assumed that the number of UEs located in a cell formed by the HAP system reaches tens of thousands, and there is a problem that a calculation amount, a circuit scale and a power consumption for evaluating the CD in the HAP system increases.

Solution to Problem

A communication relay apparatus according to an aspect of the present invention is an upper-airspace staying type communication relay apparatus that forms a cell toward the ground or the sea and performs a MU-MIMO radio communication with plural terminal apparatuses located in the cell. This communication relay apparatus comprises an array antenna having plural antenna elements that forms a cell for performing radio communications of service link to and from the plural terminal apparatuses, an uplink reception section for receiving an uplink signal capable of identifying the terminal apparatus from each of the plural terminal apparatuses via the array antenna, an angle-estimation processing section for estimating angle information indicating a direction of the terminal apparatus with reference to a position of the array antenna for each of the plural terminal apparatuses, a selection processing section for selecting a terminal apparatus to be assigned to each of plural radio resources used for a downlink of the service link based on the estimation result of the angle information on the plural terminal apparatuses, a weight calculation section for calculating a downlink beamforming weight for the terminal apparatus by the array antenna based on the estimation result of the angle information, with respect to each of the plural terminal apparatuses, and a downlink transmission section for transmitting a downlink signal to the terminal apparatus via the array antenna based on the beamforming weight corresponding to the terminal apparatus and the radio resource assigned to the terminal apparatus, with respect to each of the plural terminal apparatuses.

A communication system according to another aspect of the present invention comprises the foregoing communication relay apparatus and a terminal apparatus that performs an MU-MIMO radio communication with the foregoing communication relay apparatus.

A method according to yet another aspect of the present invention is a method that forms a cell toward the ground or the sea and performs an MU-MIMO radio communication with plural terminal apparatuses located in the cell by an upper-airspace staying type communication relay apparatus. This method comprises receiving an uplink signal capable of identifying the terminal apparatus, from each of the plural terminal apparatuses via the array antenna having plural antenna elements that forms a cell for performing radio communications of a service link between to and from the plural terminal apparatuses, estimating angle information indicating a direction of the terminal apparatus with reference to a position of the array antenna for each of the plural terminal apparatuses, selecting a terminal apparatus to be assigned to each of plural radio resources used for a downlink of the service link based on the estimation result of the angle information on the plural terminal apparatuses, calculating a downlink beamforming weight for the terminal apparatus by the array antenna based on the estimation result of the angle information, with respect to each of the plural terminal apparatuses, and transmitting a downlink signal to the terminal apparatus via the array antenna based on the beamforming weight corresponding to the terminal apparatus and the radio resource assigned to the terminal apparatus, with respect to each of the plural terminal apparatuses.

A program according to yet another aspect of the present invention is a program executed by a computer or a processor installed in an upper-airspace staying type communication relay apparatus that forms a cell toward the ground or the sea and performs an MU-MIMO radio communication with plural terminal apparatuses located in the cell. This program comprises a program code for receiving an uplink signal capable of identifying the terminal apparatus from each of the plural terminal apparatuses via an array antenna having plural antenna elements that forms a cell for performing radio communications of a service link with the plural terminal apparatuses, a program code for estimating angle information indicating a direction of the terminal apparatus with reference to a position of the array antenna, with respect to each of the plural terminal apparatuses, a program code for selecting a terminal apparatus to be assigned to each of plural radio resources used for a downlink of the service link based on the estimation result of the angle information of the plural terminal apparatuses, a program code for calculating a downlink beamforming weight for the terminal apparatus by the array antenna based on the estimation result of the angle information, with respect to each of the plural terminal apparatuses, and a program code for transmitting a downlink signal to the terminal apparatus via the array antenna based on the beamforming weight corresponding to the terminal apparatus and the radio resource assigned to the terminal apparatus, with respect to each of the plural terminal apparatuses.

In each of the foregoing communication relay apparatus, the foregoing system, the foregoing method and the foregoing program, the terminal apparatuses may be selected such that a spatial correlation among the plural terminal apparatuses is low.

In each of the foregoing communication relay apparatus, the foregoing system, the foregoing method and the foregoing program, the terminal apparatus may be selected such that the same radio resource is assigned to the plural terminal apparatuses separated from each other by the angle.

In each of the foregoing communication relay apparatus, the foregoing system, the foregoing method and the foregoing program, the angle information may be an azimuth angle and an elevation angle of a direction to the terminal apparatus with reference to a position of the array antenna.

In each of the foregoing communication relay apparatus, the foregoing system, the foregoing method and the fore-going program, the plural terminal apparatuses located in the cell may be rearranged with respect to the elevation angle and divided into plural elevation angle groups, the plural terminal apparatuses belonging to the elevation angle group may be rearranged with respect to the azimuth angle, with respect to each of the plural elevation angle groups, and the selection of the terminal apparatuses may be performed such that the same radio resource is assigned to plural terminal apparatuses separated from each other on a virtual plane having coordinate axes of the elevation angle and the azimuth angle which intersect each other.

In each of the foregoing communication relay apparatus, the foregoing system, the foregoing method and the foregoing program, the beamforming weight may be calculated according to the angle information, with respect to each of the plural terminal apparatuses.

In each of the foregoing communication relay apparatus, the foregoing system, the foregoing method and the foregoing program, channel state information between the terminal apparatus and the communication relay apparatus or information equivalent thereto may be estimated based on the angle information, and the beamforming weight may be calculated based on the estimation result.

In each of the foregoing communication relay apparatus, the foregoing system, the foregoing method and the foregoing program, a mode vector consisting of a Hadamard product of an amplitude response vector of plural antenna elements of the array antenna and a phase difference vector between the antenna elements of the plural antenna elements may be substituted as the channel state information.

Advantageous Effects of Invention

According to the present invention, in the case of performing an MU-MIMO communication (or transmission) using a multi-element array antenna between an upper-airspace staying type communication relay apparatus and plural terminal apparatuses in a cell, it is possible to improve the communication quality of the entire cell and enhance the system capacity while suppressing an increase in overhead in the terminal apparatus and communication relay apparatus even if the number of terminal apparatuses located in the cell increases.

DESCRIPTION OF EMBODIMENTS

Hereinafter, embodiments of the present invention are described with reference to the drawings.

A system according to embodiments described herein is a communication system (HAPS system), that is provided with an upper-airspace staying type communication relay apparatus (HAPS) that forms a cell toward the ground or the sea and performs MU-MIMO communication using a multi-element array antenna with plural terminal apparatuses (UE) located in the cell, capable of improving a communication quality of an entire cell and enhancing a system capacity while suppressing an increase of overhead in the UE and HAPS even if the number of UEs located in the cell increases. The communication system according to the present embodiment is suitable for realizing a three-dimensional network for the next-generation mobile communication such as the fifth generation that supports simultaneous connection to a large number of terminal apparatuses and low delay, etc.

Figure 1:
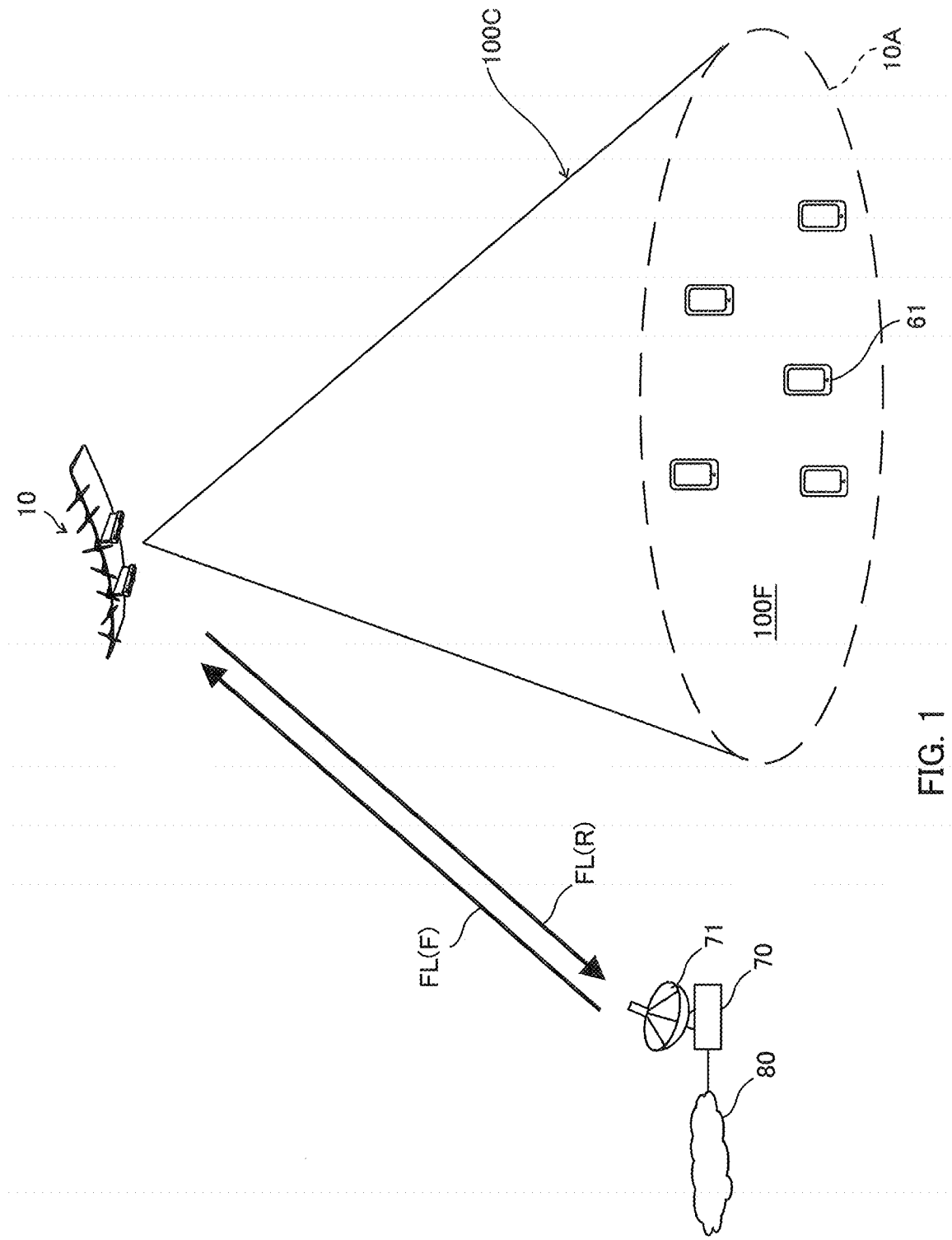
FIG. 1 is a schematic configuration diagram showing an example of an overall configuration of a communication system including a HAPS according to an embodiment.

FIG. 1 is a schematic configuration diagram showing an example of an overall configuration of a communication system including a HAPS (upper-airspace staying type communication relay apparatus) according to an embodiment. In FIG. 1, the communication system of the present embodiment (hereinafter also referred to as "HAPS system") is provided with a High-Altitude Platform Station (HAPS) (also referred to as "high altitude pseudo satellite" or "stratosphere platform") 10 as an upper-airspace staying type communication relay apparatus (radio relay apparatus). The HAPS 10 is located in an airspace at a predetermined altitude, and forms a three-dimensional cell 100C. The HAPS 10 is a floating object (for example, solar plane, airship, drone, balloon) that is controlled by autonomous control or external control so as to float or fly and be located in an airspace (floating airspace) at a predetermined altitude from the ground level or the sea level, and has a relay communication station mounted thereon. The upper-airspace staying type communication relay apparatus may be an artificial satellite with a relay communication station mounted thereon. Moreover, the communication system of the present embodiment may include one or more terminal apparatuses with which the HAPS 10 communicates, and may include a gateway station (feeder station) described below.

The airspace in which the HAPS 10 is located is, for example, a stratospheric airspace at an altitude of 11 [km] or more and 50 [km] or less on the ground (or on the water such as the sea or lake). The airspace may be an airspace at an altitude of 15 [km] or more and 25 [km] or less where weather conditions are relatively stable, and may be an airspace at an altitude of about 20 [km] in particular.

Since the HAPS is lower than the flight altitude of general artificial satellites and flies higher than base stations on the ground or on the sea, a high line-of-sight rate can be ensured while the propagation loss is smaller than that of satellite communication. This feature enables a communication service from the HAPS to a terminal apparatus (mobile station) 61, which is a user apparatus such as a cellular mobile terminal on the ground or on the sea. By providing the communication service from the HAPS, it is possible to cover a wide area with a small number of HAPS at once, where was previously covered by many base stations on the ground or on the sea, so there is an advantage capable of providing a stable communication service at low cost.

The relay communication station of the HAPS 10 forms the three-dimensional cell 100C capable of performing a radio communication with the UE 61, by forming a beam for radio communication with a user's terminal apparatus (hereinafter referred to as "UE" (user equipment)) toward the ground surface (or sea surface). A radius of a service area 10A consisting of a footprint 100F on the ground (or on the sea) of the three-dimensional cell 100C is, for example, several tens [km] to 100 [km].

In the present embodiment, the relay communication station of the HAPS 10 may form plural three-dimensional cells (for example, three cells or seven cells), and form the service area 10A consisting of plural footprints on the ground (or on the sea) of the plural three-dimensional cells.

The relay communication station of the HAPS 10 is, for example, a base station (for example, eNodeB, gNodeB) that wirelessly communicates with a gateway station (also referred to as a "feeder station") 70 as a relay station connected to a core network of a mobile communication network 80 on the ground (or on the sea) side and has an antenna 71 facing the upper airspace. The relay communication station of the HAPS 10 is connected to the core network of the mobile communication network 80 via the feeder station 70 disposed on the ground or on the sea. The communication between the HAPS 10 and the feeder station 70 may be performed by a radio communication using a radio wave such as a microwave, or may be performed by an optical communication using a laser light or the like.

The HAPS 10 may autonomously control its own floating movement (flight) and a process in the relay communication station by executing a control program by a control section configured with a computer incorporated inside or the like. For example, each of the HAPS 10 may obtain its own current position information (for example, GPS position information), position control information (for example, flight schedule information) stored in advance, position information on another HAPS located in a peripheral space, or the like, and may autonomously control the floating movement (flight) and the process in the relay communication station based on these kinds of information.

Further, the floating movement (flight) of the HAPS 10 and the process in the relay communication station may be controlled by a management apparatus (also referred to as a "remote control apparatus") as a management apparatus provided in a communication center of the mobile communication network 80 or the like. The management apparatus can be configured with, for example, a computer apparatus such as a PC, a server, or the like. In this case, the HAPS 10 may incorporate a communication terminal apparatus for control (for example, mobile communication module) so as to be capable of receiving control information from the management apparatus and transmitting various kinds of information such as monitoring information to the management apparatus, and may be assigned terminal identification information (for example, IP address, phone number, etc.) so as to be identified from the management apparatus. The MAC address of the communication interface may be used to identify the communication terminal apparatus for control. Moreover, the HAPS 10 may transmit information on the floating movement (flight) of the own HAPS or a surrounding HAPS and the process in the relay communication station, and monitoring information such as information on a status of the HAPS 10 and observation data obtained by various kinds of sensors, to a predetermined destination such as the management apparatus. The control information may include information on a target flight route of the HAPS. The monitoring information may include at least one of information on current position, flight-route history information, velocity relative to the air, velocity relative to the ground and propulsion direction of the HAPS 10, wind velocity and wind direction around the HAPS 10, and atmospheric pressure and temperature around the HAPS 10.

Figure 2:
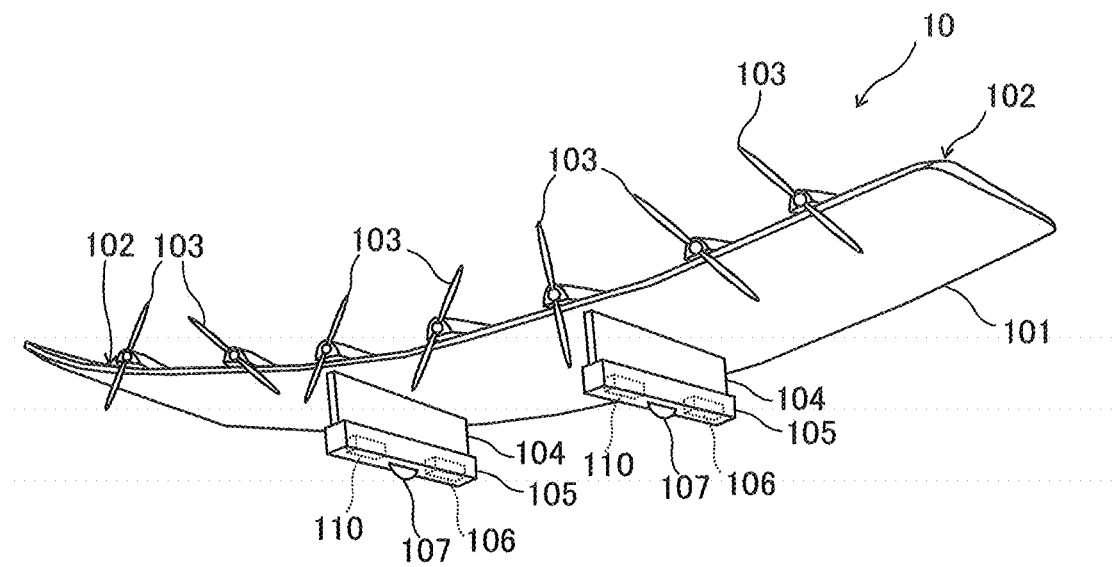
FIG. 2 is a perspective view showing an example of a HAPS of an embodiment.

FIG. 2 is a perspective view showing an example of the HAPS 10 used in the communication system of the embodiment.

The HAPS 10 in FIG. 2 is a solar-plane type HAPS, and is provided with a main wing section 101 with both ends in the longitudinal direction curved upward, and plural motor-driven propellers 103 as propulsion apparatuses for bus power system on one end section in the short direction of the main wing section 101. On the upper surface of the main wing section 101, a photovoltaic-power generation panel (hereinafter referred to as "solar panel") 102 is provided as a photovoltaic-power generation section having a photovoltaic-power generation function. At two locations in the longitudinal direction of the lower surface of the main wing section 101, plural pods 105 serving as equipment housing sections for housing mission equipment are connected via plate-like connecting sections 104. Inside each pod 105, a relay communication station 110 as a mission equipment and a battery 106 are accommodated. On the undersurface side of each pod 105, wheels 107 are provided for use during takeoff and landing. The electric power generated by the solar panel 102 is stored in the battery 106, the electric power supplied from the battery 106 rotates the motor of the propeller 103, and the radio relay process is performed by the relay communication station 110.

Figure 3:
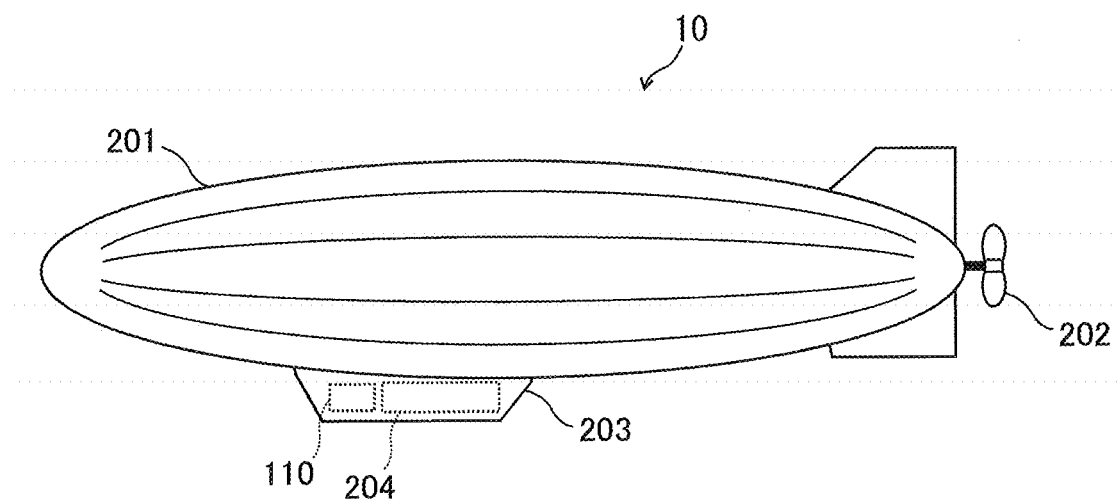
FIG. 3 is a side view showing another example of a HAPS of an embodiment.

FIG. 3 is a perspective view showing another example of HAPS 10 used in the communication system of the embodiment. The HAPS 10 in FIG. 3 is an unmanned-airship type HAPS, and it can be equipped with a large-capacity battery because it has a large payload. The HAPS 10 is provided with an airship body 201 filled with a gas such as helium gas for floating by buoyancy, a motor-driven propeller 202 as a propulsion apparatus for bus power system, and an equipment housing section 203 for housing mission equipment. Inside the equipment housing section 203, the relay communication station 110 and the battery 204 are accommodated. The electric power supplied from the battery 204 drives the motor of the propeller 202 to rotate, and the relay communication station 110 performs the radio relay process. It is noted that, a solar panel having a photovoltaic-power generation function may be provided on the upper surface of the airship body 201, and the electric power generated by the solar panel may be stored in the battery 204.

In the following embodiments, although it is illustrated and described for a case in which the upper-airspace staying type communication relay apparatus for wirelessly communicating with the UE 61 is either one of the solar-plane type HAPS 10 in FIG. 2 or the unmanned-airship type HAPS 20, the upper-airspace staying type communication relay apparatus may be the unmanned-airship type HAPS 10 in FIG. 3. The following embodiments can be similarly applied to other upper-airspace staying type communication relay apparatuses other than the HAPS 10.

Links FL(F) and FL(R) between the HAPS 10 and a gateway station (hereinafter abbreviated as "GW station") 70 as a feeder station are called "feeder links", and a link between the HAPS 10 and the UE 61 is called a "service link". In particular, a section between the HAPS 10 and the GW station 70 is called a "radio section of feeder link". Moreover, a downlink of communication from the GW station 70 to the UE 61 via the HAPS 10 is called a "forward link" FL(F), and an uplink of communication from the UE 61 to the GW station 70 via the HAPS 10 is also called a "reverse link" FL(R).

Duplex methods of uplink and downlink for radio communication with the UE 61 via the relay communication station 110 are not limited to specific methods, and may be, for example, a time division duplex method (Time Division Duplex: TDD) or a frequency division duplex method (Frequency Division Duplex: FDD).

An access method for radio communication with the UE 61 via the relay communication station 110 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access).

In the radio communication of the service link of the present embodiment, a massive MIMO (Multi-Input and Multi-Output) technology is used, which has functions of diversity/coding, transmission beam forming, spatial division multiplexing (SDM: Spatial Division Multiplexing), etc., and which performs a multi-layer transmission using an array antenna with a large number of antenna elements. In particular, in the present embodiment, in a downlink communication from the relay communication station 110 as a base station (for example, eNodeB, gNodeB) to plural UEs 61 in the cell, a MU-MIMO (Multi-User MIMO) technology is used, which transmits signals to plural different UEs 61 at the same time and on the same frequency. By performing the MU-MIMO transmission using an array antenna with a large number of antenna elements, since it is possible to communicate by directing an appropriate beam for each UE 61 according to the communication environment of each UE 61, the communication quality of the entire cell can be improved. Since the communication with plural UEs 61 can be performed using the same radio resource (time/frequency resource), a system capacity can be enhanced.

Figure 4:
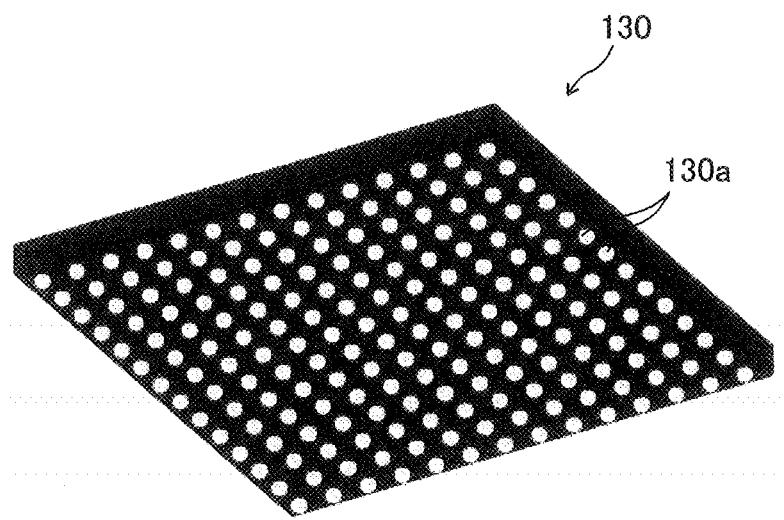
FIG. 4 is a perspective view showing an example of an array antenna for a service link of a HAPS of an embodiment.
Figure 5:
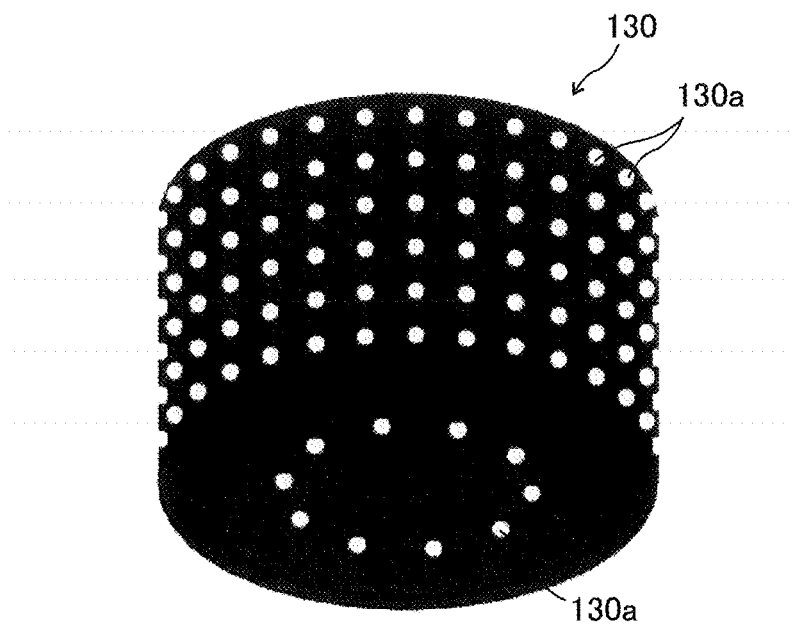
FIG. 5 is a perspective view showing another example of an array antenna for a service link of a HAPS of an embodiment.

Each of FIG. 4 and FIG. 5 is perspective view showing an example of an array antenna 130 configured with multiple elements that can be used for the MU-MIMO transmission system in the HAPS 10 of the present embodiment.

The array antenna 130 in FIG. 4 is a planar-type array antenna, which has a planar antenna base, and in which a large number of antenna elements 130a such as patch antennas are two-dimensionally disposed along a planar antenna surface of the antenna base in axial directions orthogonal to each other.

The array antenna 130 in FIG. 5 is a cylinder-type array antenna, which has a cylindrical or columnar antenna base, and in which a large number of antenna elements 130a such as patch antennas are disposed along an axial direction and a circumferential direction of a circumferential side surface as a first antenna surface of the antenna base. In the array antenna 130 of FIG. 5, as shown in the figure, plural antenna elements 130a such as patch antennas may be disposed in a circular shape along a bottom surface as a second antenna surface. The antenna base in FIG. 5 may be a polygonal tubular or polygonal cylindrical antenna base.

It is noted that, the shape of the array antenna 130, and the number, types and placement of the antenna elements are not limited to those exemplified in FIG. 4 and FIG. 5.

Figure 6:
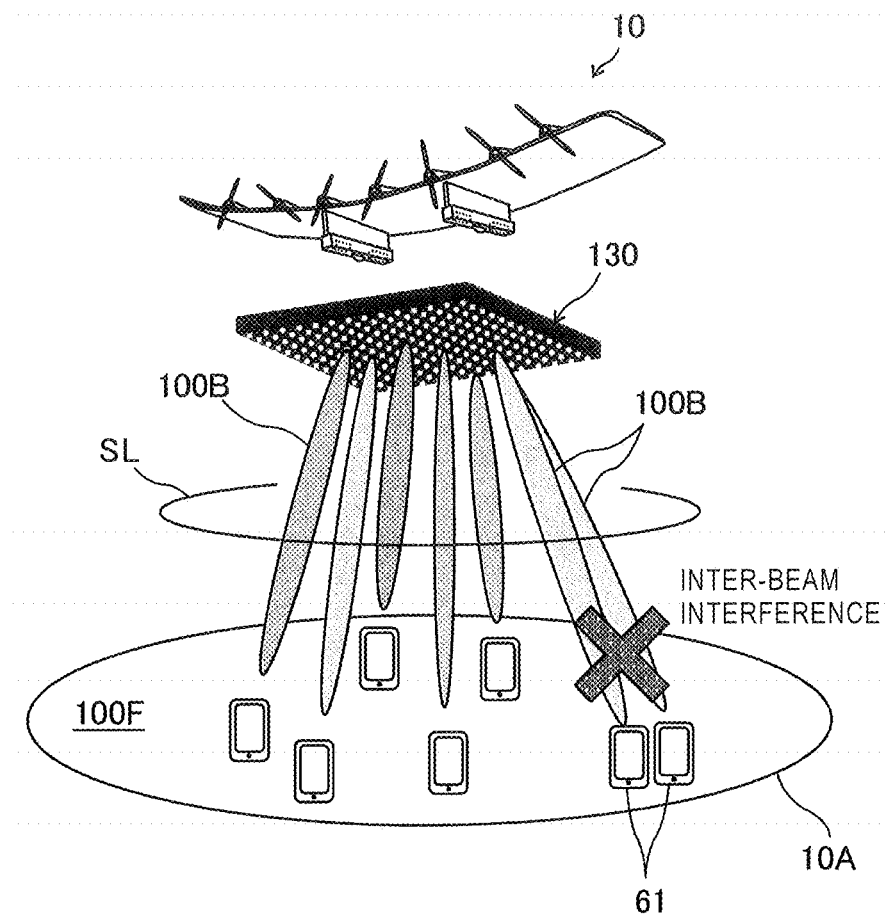
FIG. 6 is an illustration showing an example of beamforming in MU-MIMO using an array antenna of a HAPS.

FIG. 6 is an illustration showing an example of beamforming in the MU-MIMO transmission system using the array antenna 130 of the HAPS 10. In the service link SL between the array antenna 130 of the HAPS 10 and the service area 100A (footprint 100F of the cell 100C) in FIG. 6, using the MU-MIMO transmission system, by performing beamforming in which an appropriate beam 100B is individually directed to each UE 61 according to the communication environment of each UE 61, the communication quality can be improved. In particular, in the case of using the MU-MIMO transmission system that communicates with plural UEs 61 using the same radio resource (for example, the same time/frequency resource block (RB)) in the service link SL, the system capacity can be improved.

In the case of using the MU-MIMO transmission system with a beamforming control in the HAPS 10 of the present embodiment, CSI (channel state information) between each UE 61 and the HAPS 10 needs to be obtained in order to direct appropriate beam 100B to each UE 61 individually.

The communication quality changes greatly depending on which UE 61 is assigned to a certain radio resource (RB). For example, in the case of assigning the same frequency resource to the UEs 61 that are close to each other in FIG. 6, plural beams 100B directed from the HAPS 10 to respective UEs 61 interfere with each other, and the communication quality may be significantly deteriorate.

As a MU-MIMO system that directs an appropriate beam individually to each UE by using a multi-element array antenna and suppresses the deterioration of communication quality by suppressing interference between plural beams that are close to each other in spatial distance, as shown in the following reference example, a CSI-based MU-MIMO system is generally used, which uses CSI estimated by receiving a reference signal (SRS: Sounding Reference Signal) from each UE.

Figure 7:
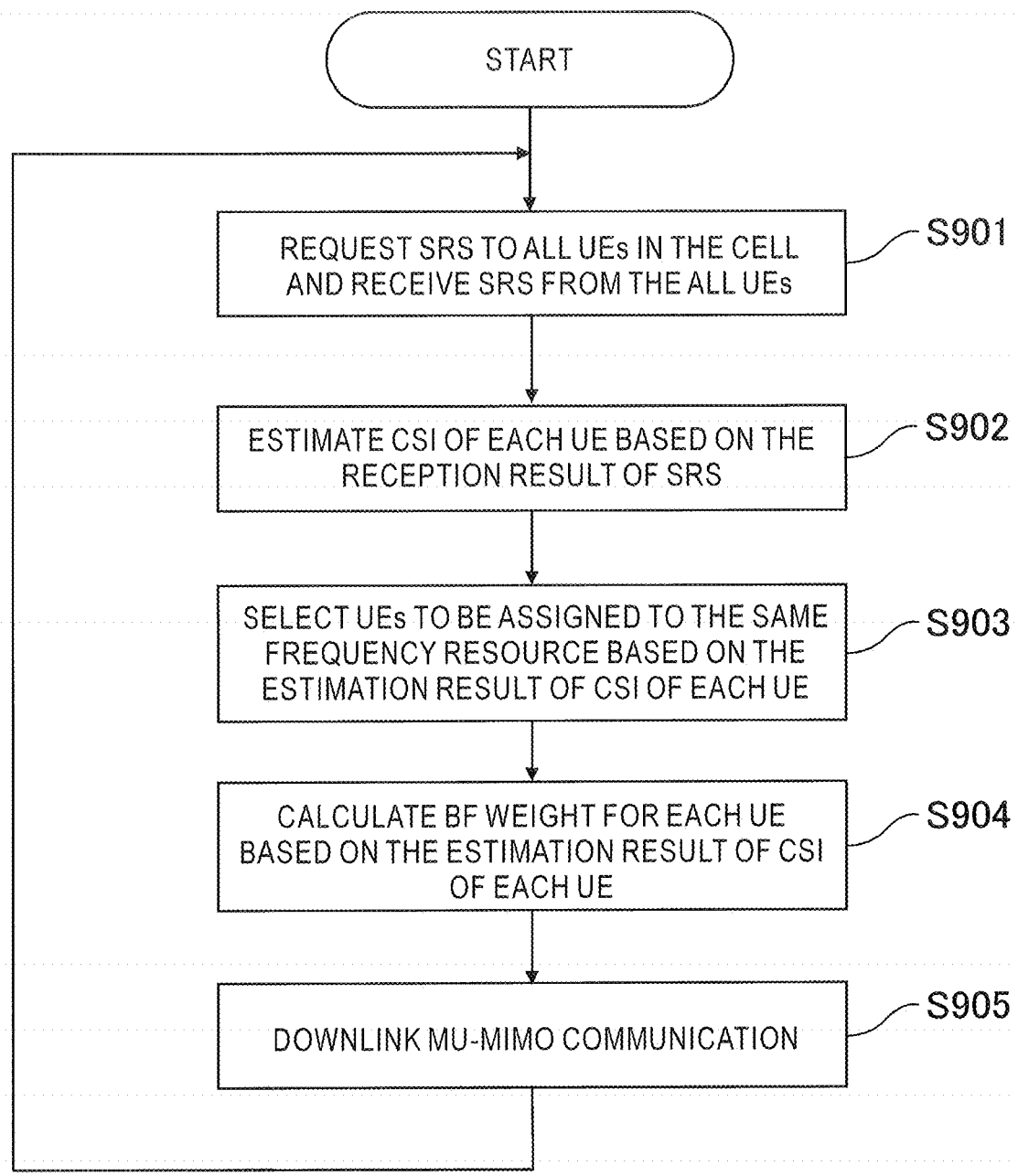
FIG. 7 is a flowchart of a UE selection and a BF weight calculation in MU-MIMO according to a reference example.
Figure 8:
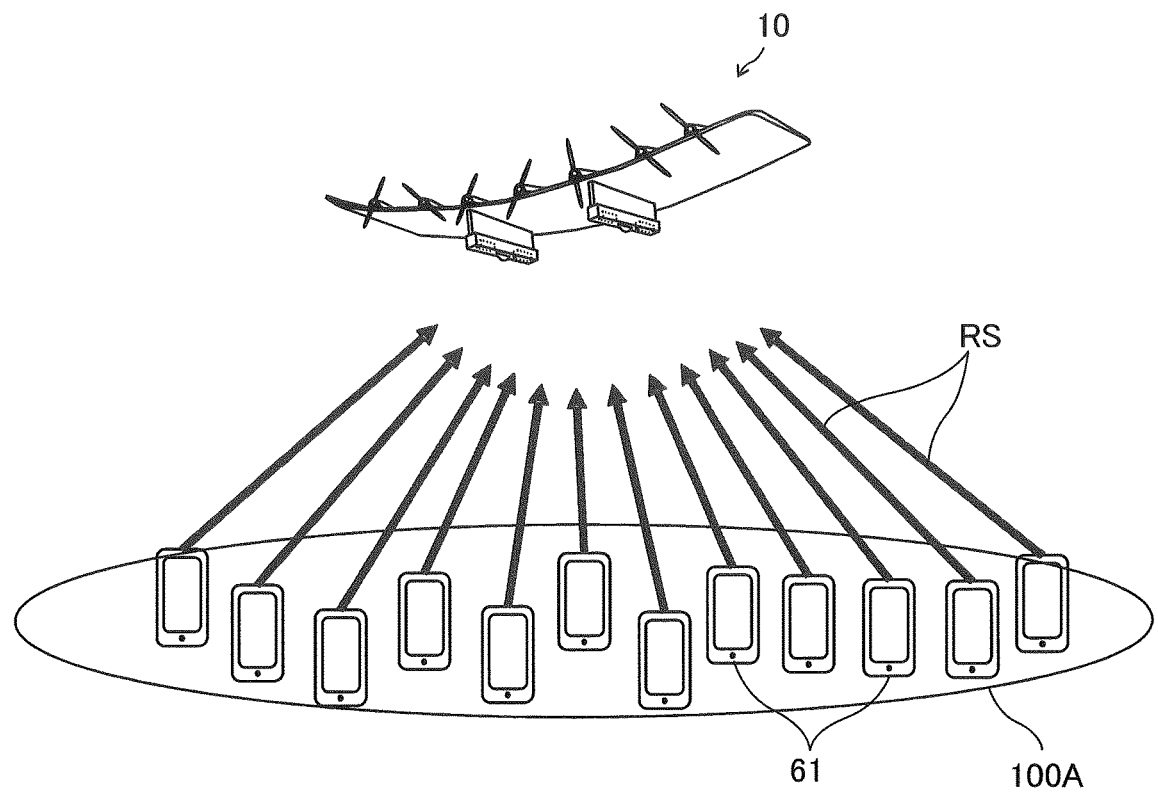
FIG. 8 is an illustration of transmission of reference signals from UEs in a cell in MU-MIMO according to a reference example.

FIG. 7 is a flowchart of a UE selection and a BF weight calculation in MU-MIMO according to a reference example. FIG. 8 is an illustration of transmission of reference signals from UEs in a cell in MU-MIMO according to a reference example. In FIG. 7, the HAPS requests SRSs to all UEs in the cell, receives SRSs from all UEs as shown in FIG. 8 (S901), and estimates the CSI of each UE based on the SRS reception results (S902). The HAPS selects UEs to be assigned to the same radio resource (RB) from all UEs in the cell, with respect to each of the plural radio resources (RB) used for downlink communication, based on the CSI estimation result of each UE (S903). By this UE selection, plural UEs with low spatial correlation are assigned to the same radio resource (RB). Based on the CSI estimation result of each UE, the HAPS calculates a BF weight to apply to the signal of each antenna element of the array antenna for forming individual beam to each UE (S904). The HAPS performs a downlink MU-MIMO communication for each UE based on the UE selection result for each radio resource (RB) and the BF weight calculation result for each UE (S905).

In the CSI-based MU-MIMO system of the reference example described above, in the UE selection and the BF weight calculation, the CSI of all UEs is required, and it is necessary to periodically receive the reference signals (SRS) from all UEs in the cell to obtain the CSI of each UE. In particular, in the case of the HAPS, it is assumed that the number of the connected UEs located in the cell reaches tens of thousands, and the overhead increases due to the frequent transmission of the reference signal (SRS) from each UE to the HAPS.

In the CSI-based MU-MIMO system of the reference example described above, the amount of computation and the like in the UE selection process increases rapidly depending on the increase in the number of UEs located in the cell of the HAPS. For example, assuming that the UE selection is performed by repeatedly evaluating an orthogonality degree of channel (CD) between the UEs, which is proposed in Non-Patent Literature 1 described above, with an orthogonality degree of CSI based on CSI obtained from the UEs, when the number of UEs is 5,000, the number of evaluations of the orthogonality degree of CSI reaches 12 million or more, and when the number of UEs reaches 20,000, the number of evaluations of the orthogonality degree of CSI reaches 200 million or more. Therefore, the amount of calculation, the size of the calculation circuit and the power consumption during the UE selection process increase, and the use of the UE selection method based on the orthogonality degree of CSI is not realistic in the MU-MIMO system in the cell of the HAPS.

Therefore, in the present embodiment, focusing on the characteristics of the HAPS system (a cellular-radio communication system forming a cell with the HAPS in the upper airspace) compared to the terrestrial system (a cellular-radio communication system forming a cell with fixed base stations on the ground), as described below, the UE selection and BF weight calculation are performed based on angle information indicating the direction to the UE in the cell without calculating the orthogonality degree of the CSI obtained based on the reference signal (SRS).

Figure 9:
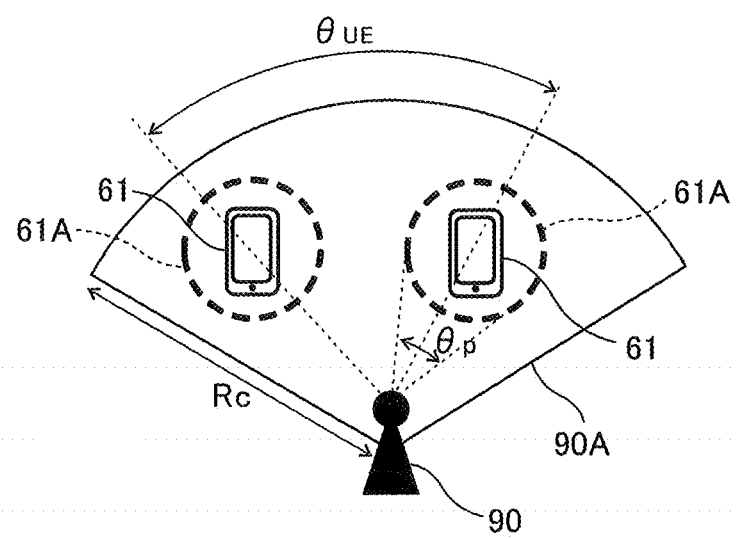
FIG. 9 is an illustration showing a positional relationship between a fixed base station and UEs within a service area in a communication system via a fixed base station on the ground according to a reference example.
Figure 10:
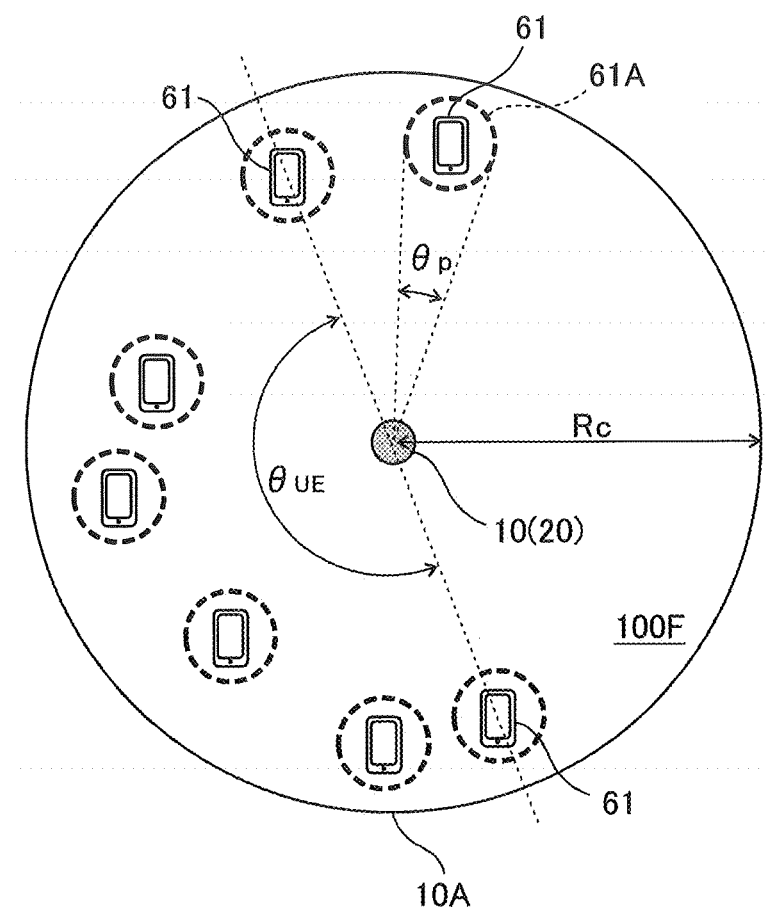
FIG. 10 is an illustration showing a positional relationship between a HAPS and UEs within a service area in a communication system via a HAPS according to an embodiment.

FIG. 9 is an illustration showing a positional relationship between a fixed base station 90 and the UE 61 in a service area (cell) 90A in a communication system (terrestrial system) via the fixed base station on the ground according to the reference example. FIG. 10 is an illustration showing a positional relationship between the HAPS 10 and the UE 61 in the service area (cell footprint) 10A in the communication system (HAPS system) via the HAPS 10 according to the present embodiment.

In the service area 90A with a radius Rc of several kilometers in the terrestrial system of FIG. 9, the size of the area is small, the number of UEs in the area is small, and the distance between the fixed base station 90 and the UE 61 is short. Therefore, an angle $\theta_{UE}$ between the UEs viewed from the antenna of the fixed base station 90 is small, and a scattering area 61A due to multipath is large with respect to the propagation distance of radio waves between the fixed base station 90 and the UE 61, and the prospective angle θp of the scattering area 61A viewed from the antenna of the fixed base station 90 is large. Accordingly, in the terrestrial system, radio waves transmitted from one UE 61 tend to arrive from unspecified directions, and it is difficult to combine plural UEs with a large angle $\theta_{UE}$ between the UEs in the UE selection process described above.

On the other hand, in the service area 90A with a radius Rc of several tens of kilometers to 100 kilometers in the HAPS system of FIG. 10, the size of the area is large, the number of UEs in the area is large, and the distance between the HAPS 10 and the UE 61 is long. Therefore, UEs with a large angle $\theta_{UE}$ between UEs viewed from the antenna of the HAPS 10 exists in the area, and the scattering area 61A due to multipath is small with respect to the propagation distance of radio waves between the HAPS 10 and the UE 61, and the prospective angle θp of the scattering area 61A viewed from the antenna of the fixed base station 90 is small.

Accordingly, in the HAPS system, radio waves transmitted from one UE 61 arrive from a specific direction, and plural UEs with a large angle $\theta_{UE}$ between the UEs are likely to be combined in the UE selection process described above.

As shown above, focusing on the features of the HAPS system compared to the terrestrial system, the UE selection and the BF weight calculation are performed based on the angle information indicating the direction of the UE 61 in the service area 10A as shown below, without calculating the orthogonality degree of the CSI obtained based on the reference signal (SRS).

Figure 11:
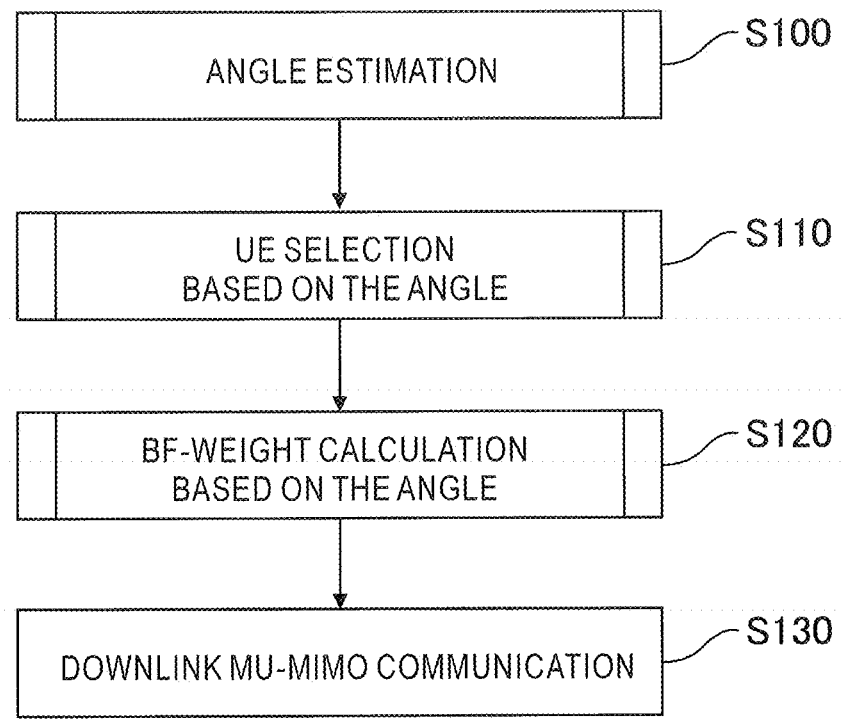
FIG. 11 is a flowchart showing an example of a UE selection and a BF weight calculation in MU-MIMO of a HAPS according to an embodiment.

FIG. 11 is a flowchart showing an example of a selection of the UE 61 and a BF weight calculation in MU-MIMO of the HAPS 10 according to the present embodiment. In FIG. 11, first, with respect to all UEs 61 in the service area 10A, the relay communication station 110 of the HAPS 10 estimates angles (azimuth angle, elevation angle) indicating the direction to the UE 61 with reference to the array antenna 130 of the HAPS 10, based on any uplink signal capable of uniquely identifying the UE which is received from the UE 61 (S100). Since the angles (azimuth angle, elevation angle) to the UE 61 can be estimated from any uplink signal, there is no overhead associated with the transmission and reception of the reference signal (SRS), unlike the reference example described above. Although the CSI used for the UE selection depends on the frequency in the reference example described above, the angles (azimuth angle, elevation angle) of the UE 61 estimated in the present embodiment does not depend on the frequency, so the angle of the UE 61 can be estimated regardless of TDD/FDD.

As an estimation method of the angles (azimuth angle, elevation angle) of the UE 61, for example, a method of obtaining the azimuth angle/elevation angle of each UE 61 by applying an angle estimation algorithm based on the uplink signal from the UE 61 can be used. The estimation method of the angles (azimuth angle, elevation angle) of the UE 61 may be a method of directly notifying the position information (for example, GPS position information, etc.) on the UE 61 itself to the HAPS 10 side and calculating the azimuth angle/elevation angle of each UE 61 from the position information.

Next, the relay communication station 110 of the HAPS 10 performs the UE selection so that the spatial correlation between the UEs is low, based on the angles (azimuth angle, elevation angle) of each UE 61 estimated for all the UEs 61 in the service area 10A (S110). By performing the UE selection based on the angles (azimuth angle, elevation angle), the amount of computation can be significantly reduced compared to the UE selection based on the CSI in the above-described reference example.

Next, the relay communication station 110 of the HAPS 10 calculates the BF weight to be applied to each antenna element of the array antenna 130 when forming a beam for each UE 61, based on the angles (azimuth angle, elevation angle) of each UE 61 estimated for all UEs 61 in the service area 10A (S120). For this BF weight calculation, two types of BF methods can be selectively used as described below, for example. The first BF method is a method of calculating the BF weights so as to perform a beam forming control (beam steering) according to estimated values of angles (azimuth angle, elevation angle) of each UE 61. Since the first BF method does not perform a CSI restoration process, the amount of calculation is smaller than that of the second BF method. The second BF method is a method of calculating the BF weights so as to perform a beam forming control (beam steering) by estimating (restoring) the CSI based on the estimated values of the angles (azimuth angle, elevation angle) of each UE 61. In this second BF method, a general beam forming algorithm based on the CSI can be used.

Next, the relay communication station 110 of the HAPS 10 can perform a downlink MU-MIMO communication with each UE 61 based on the UE selection result and the BF weight calculation result, in the service link communicating with the UE 61 in the service area 10A (S130).

Figure 12:
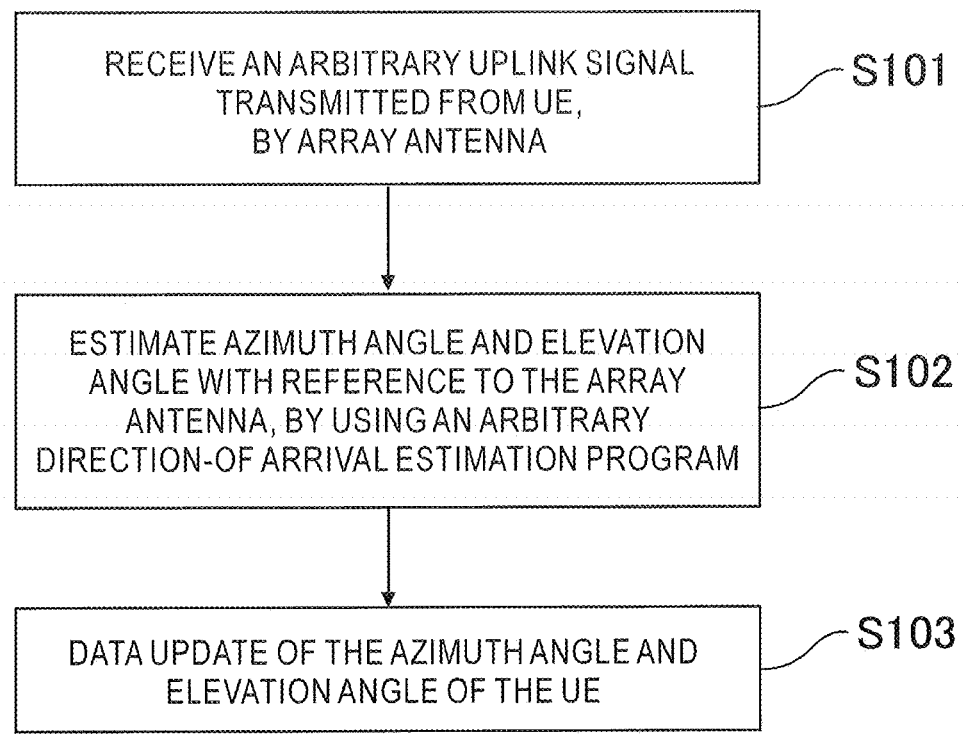
FIG. 12 is a flow chart showing an example of an angle estimation in FIG. 11.
Figure 13:
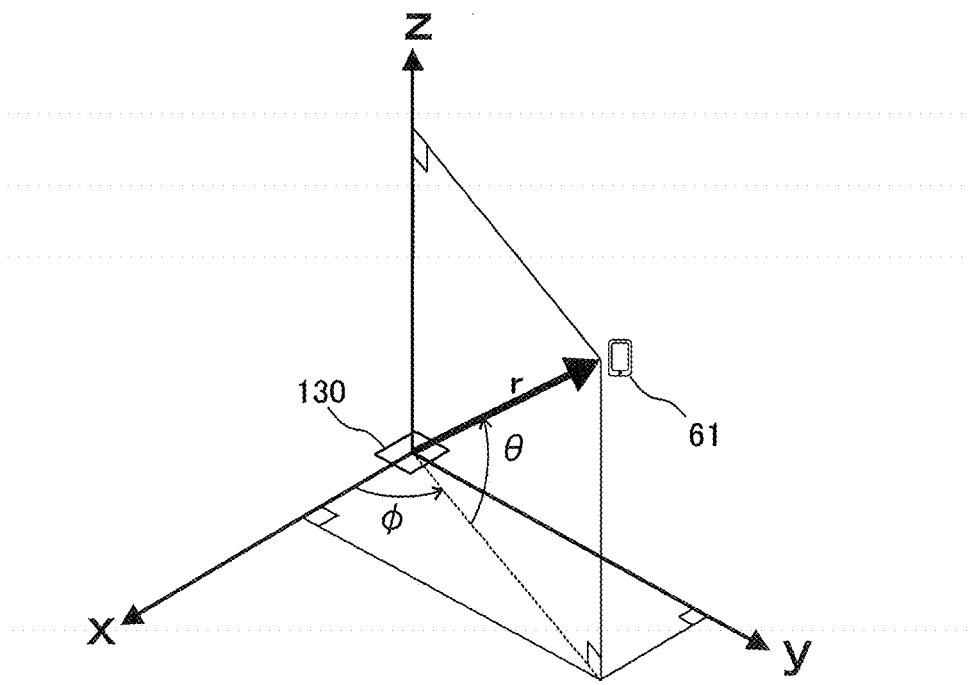
FIG. 13 is an illustration showing definitions of an azimuth angle and an elevation angle with reference to a direction of a UE in a coordinate system with reference to a position of the HAPS.

FIG. 12 is a flow chart showing an example of the angle estimation in FIG. 11. FIG. 13 is an illustration showing definitions of the azimuth angle φ and elevation angle θ for the direction to the UE 61 in the coordinate system with reference to the position of the HAPS 10. It is noted that, in FIG. 12, for simplification of description, the angle estimation process for one certain UE 61 is shown.

In the angle estimation process of FIG. 12, first, the relay communication station 110 of the HAPS 10 receives an arbitrary uplink signal including information that can uniquely identify the UE 61, by the array antenna 130 (S101). Since the arbitrary uplink signal transmitted from the UE 61 can be used, there is no need to separately request the UE 61 to receive the reference signal (SRS) as used in the above-described reference example. It is noted that, the step S101 may be omitted if there is an uplink signal received immediately before the angle estimation process.

Next, the relay communication station 110 of the HAPS 10 uses an arbitrary radio wave direction-of-arrival estimation program to estimate the azimuth angle φ and the elevation angle θ (see FIG. 13) indicating the direction to the UE 61 with reference to the position of the array antenna 130 of the HAPS 10 (S102). Herein, since the distance between the HAPS 10 in the upper airspace and the UE 61 on the ground (or on the sea) is sufficiently long, the influence of reflected waves and the like is small, and the angles (azimuth angle φ, elevation angle θ) can be estimated with sufficient accuracy even with the basic algorithm of arbitrary radio wave direction-of-arrival estimation program.

Next, the relay communication station 110 of the HAPS 10 updates the data of the angles (azimuth angle φ, elevation angle θ) of the UE 61 stored in a storage section such as a memory with the estimated values of the newly estimated angles (azimuth angle φ, elevation angle θ) of the UE 61 (S103).

Figure 14:
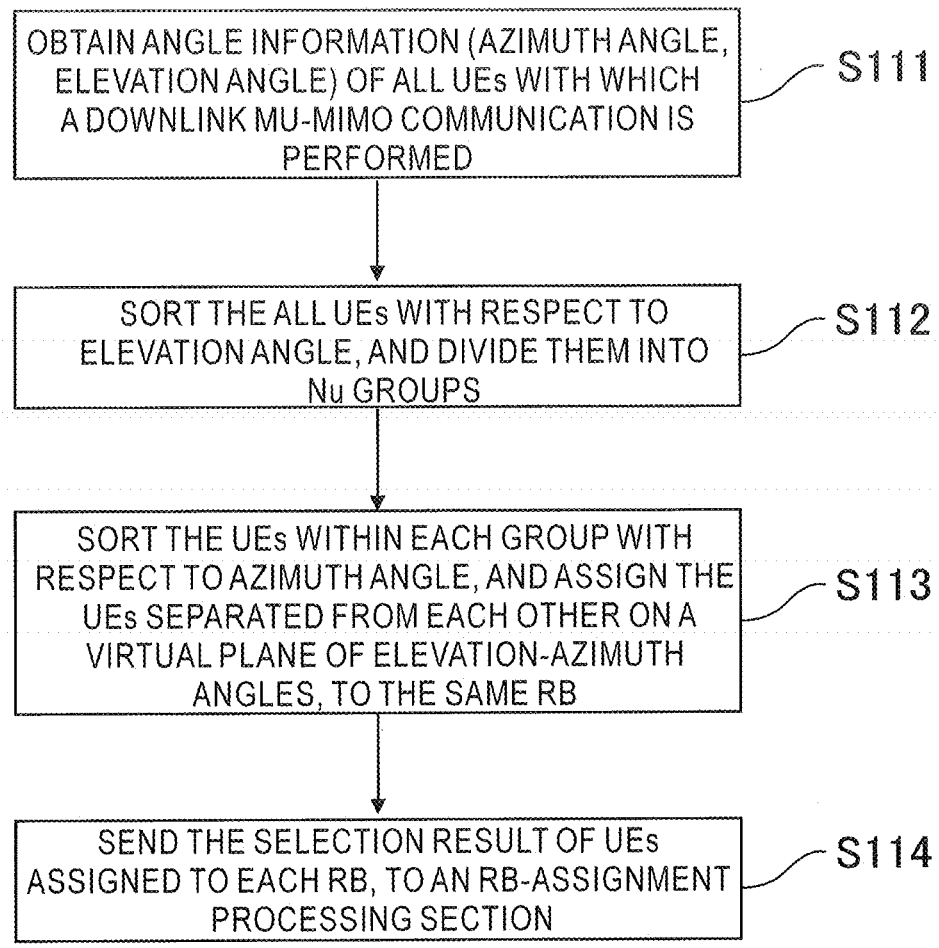
FIG. 14 is a flow chart showing an example of a UE selection based on angle information in FIG. 11.
Figure 15:
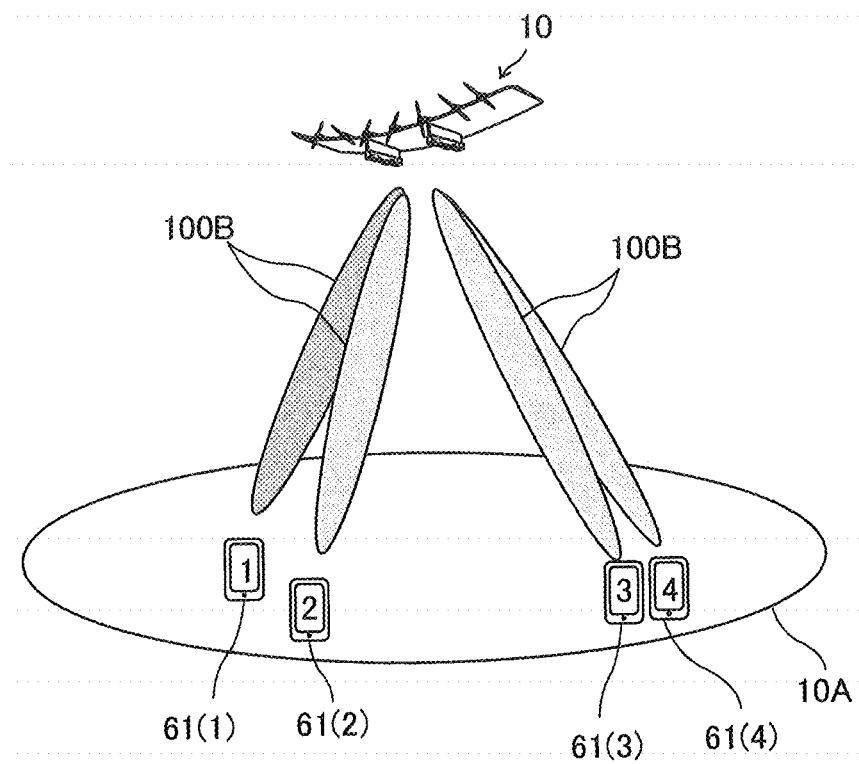
FIG. 15 is an illustration showing an example of a UE selection in FIG. 14.
Figure 16:
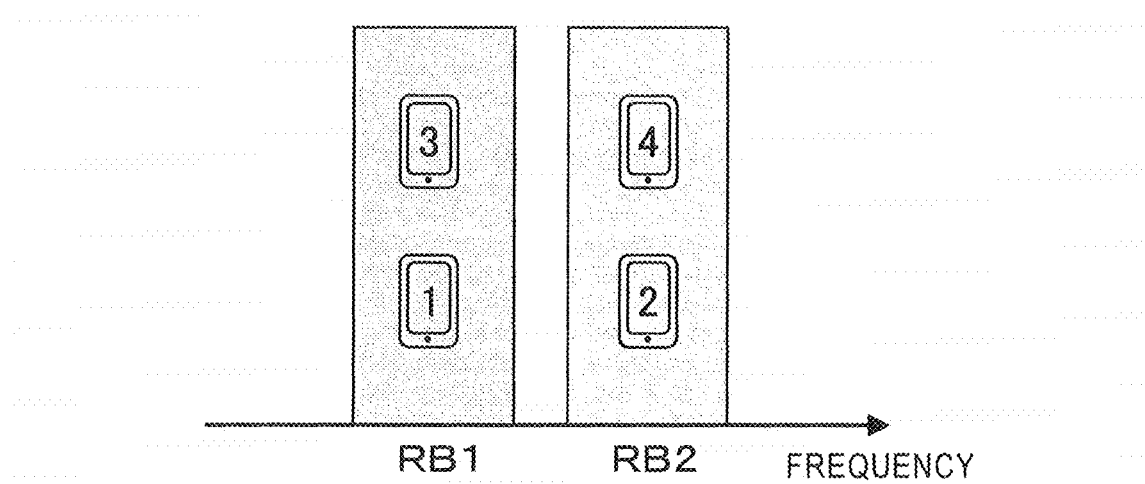
FIG. 16 is an illustration showing an example of assignment of resource blocks on a frequency axis to each UE selected in FIG. 15.

FIG. 14 is a flow chart showing an example of the selection of the UE 61 based on the angle information (azimuth angle, elevation angle) in FIG. 11. FIG. 15 is an illustration showing an example of the selection of the UE 61 in FIG. 14. FIG. 16 is an illustration showing an example of assignment of resource blocks on the frequency axis to each UE selected in FIG. 15. It is noted that FIG. 14 shows the UE selection process in one certain downlink MU-MIMO communication for simplification of explanation. FIG. 15 and FIG. 16 show an example in which the UEs 61(1), 61(2) and the UEs 61(3), 61(4) are located apart at area ends far from each other in the service area 10A, the distance between the UE 61(1) and the UE 61(2) is short, and the distance between the UE 61(3) and the UE 61(4) is short.

The UE selection process in FIG. 14 is performed based on the following criteria. In order to reduce the inter-UE interference (inter-beam interference) in the service area 10A and achieve a high throughput, it is generally used to assign plural UEs 61 with low spatial correlation with each other to the same radio resource (for example, the same RB (resource block)). As described above, in the HAPS system, the scattering area 61A is narrow with respect to the propagation distance (the spread angle θp of the scattering area 61A viewed from the HAPS 10 is small). Herein, in the case of the service area 10A of the HAPS 10, the plural UEs 61 with low spatial correlation with each other are plural UEs 61 that are spatially separated from each other as exemplified in FIG. 15, that is, the plural UEs 61 whose angle information (azimuth angle φ, elevation angle θ) are separated from each other. Therefore, as exemplified in FIG. 16, the plural UEs 61 whose angle information (azimuth angle φ, elevation angle θ) are separated from each other may be assigned to the same radio resource (same RB).

In the UE selection process of FIG. 14, first, the relay communication station 110 of the HAPS 10 obtains angle information (azimuth angle φ, elevation angle θ) on all UEs 61 performing downlink communications in the service area 10A (S111).

Figure 17:
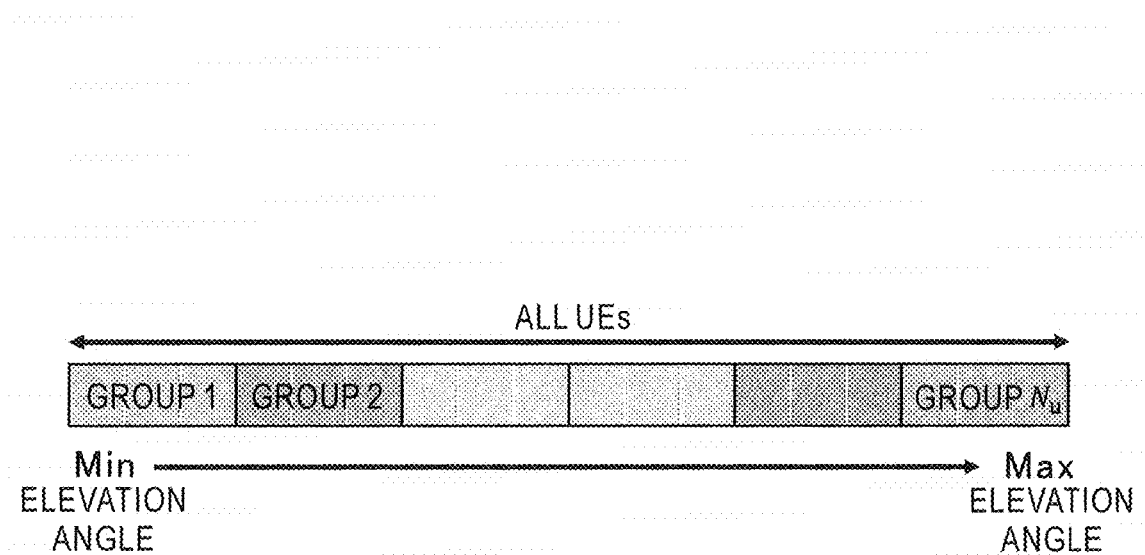
FIG. 17 is an illustration showing an example of sorting and grouping of UEs for elevation angles in the UE selection process of FIG. 14.

Next, the relay communication station 110 of the HAPS 10 sorts all the UEs 61 with respect to the elevation angle θ and divides them into Nu groups as exemplified in FIG. 17 (S112 in FIG. 14). Herein, Nu is the number of UEs 61 assigned to the same radio resource (same RB) when performing a MU-MIMO transmission. The value of Nu may vary according to the distribution of UEs 61 in the service area 10A.

Figure 18:
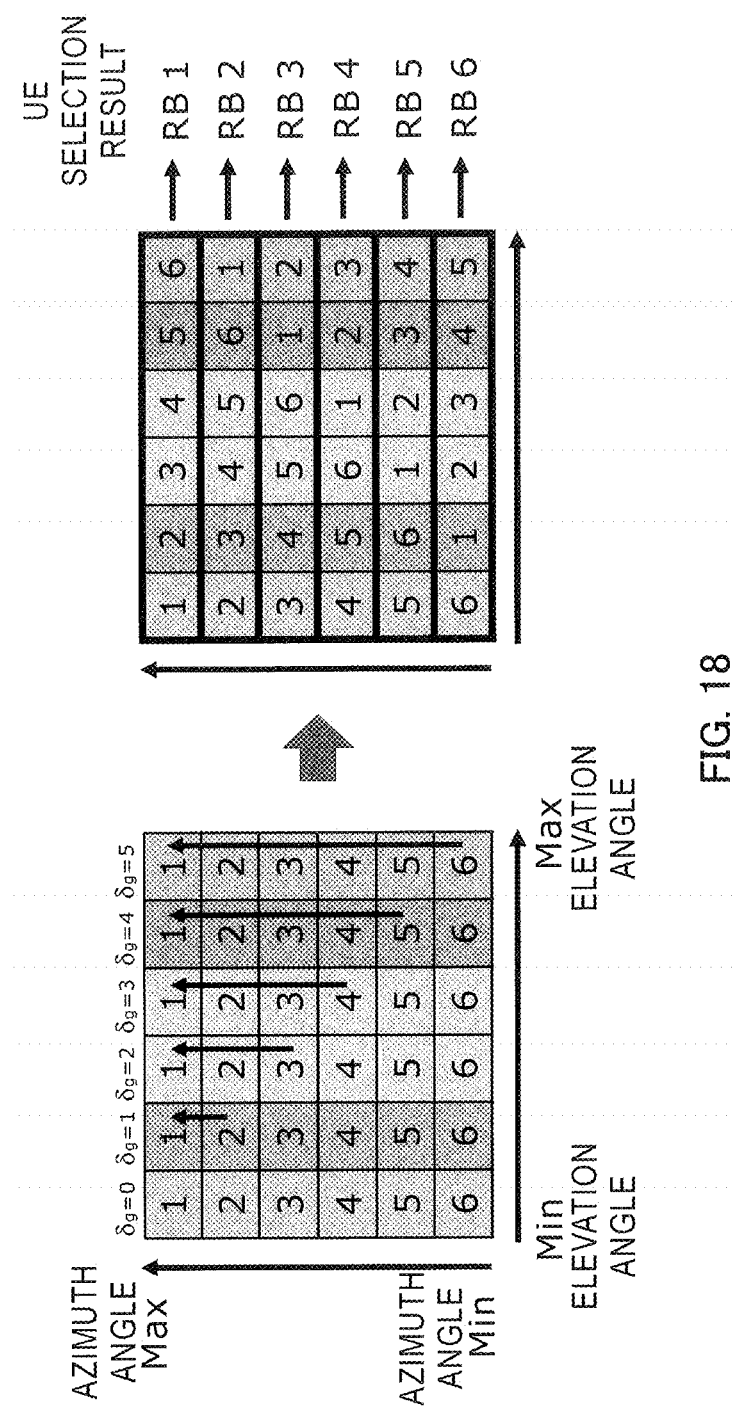
FIG. 18 is an illustration showing an example of sorting and selecting UEs for azimuth angles after the grouping of FIG. 17.

Next, as exemplified in FIG. 18, the relay communication station 110 of the HAPS 10 sorts the UEs 61 with respect to the azimuth angle φ within each group, and assigns the UEs 61 separated from each other on a virtual plane of elevation-azimuth angle to the same radio resource (same RB) (S113 in FIG. 14). In the example of FIG. 18, where Nu is 6, the 6 UEs are sorted with respect to the azimuth angle φ within each group, an offset δg in azimuth angle φ is applied by given to the g-th group, and the same radio resource (the same RB) assigned to the 6 UEs 61 belonging to the same azimuth angle group in the virtual plane of elevation-azimuth angle after applying the offset δg. It is noted that the value of the offset δg may be changed for each elevation angle group according to the distribution of the UEs 61 in the service area 10A.

Next, the relay communication station 110 of the HAPS 10 sends the selection result of the UE 61 assigned to each radio resource (same RB) to an RB-assignment processing section described below (S114 in FIG. 14).

Figure 19:
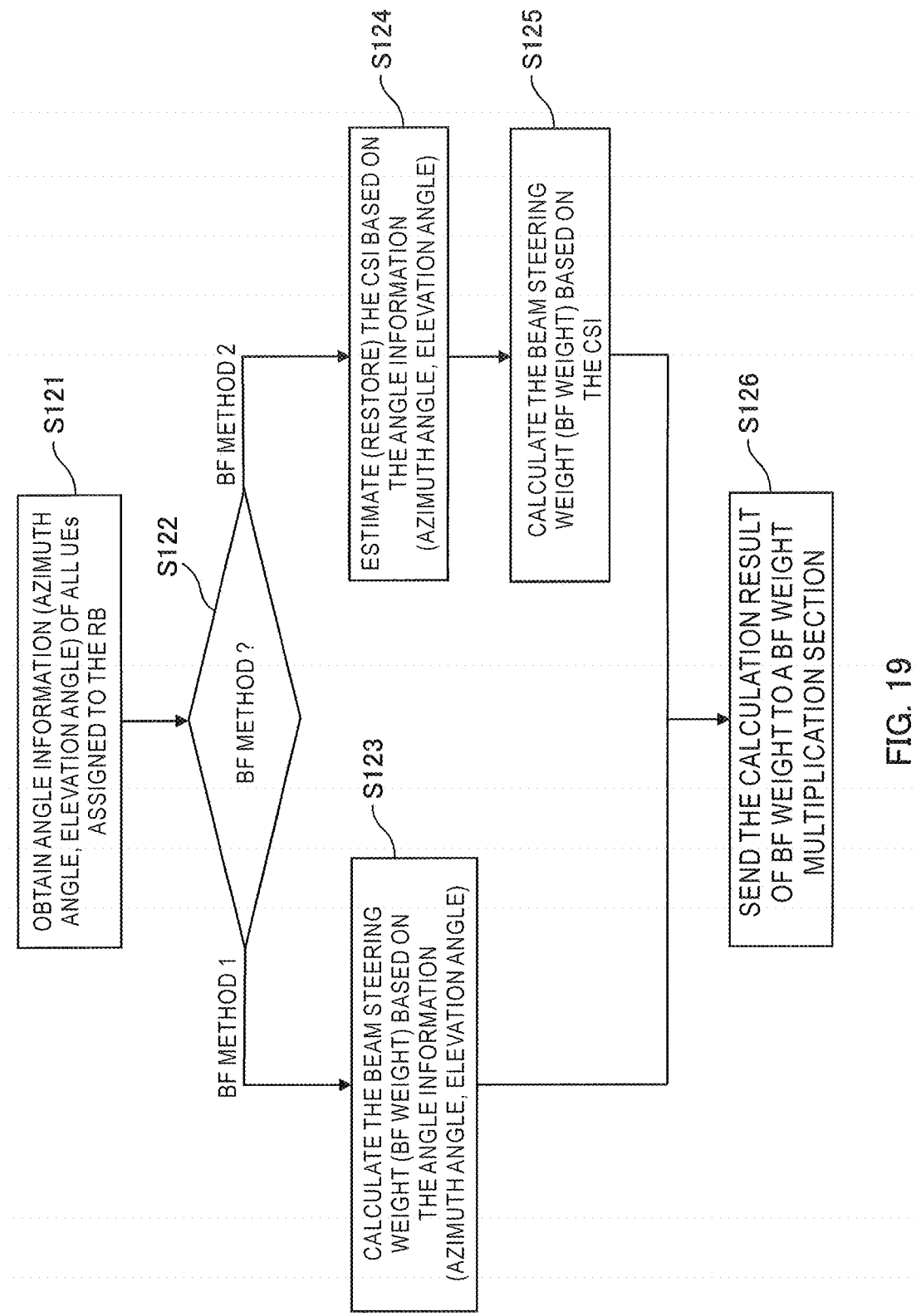
FIG. 19 is a flow chart showing an example of a BF weight calculation based on angle information in FIG. 11.
Figure 20:
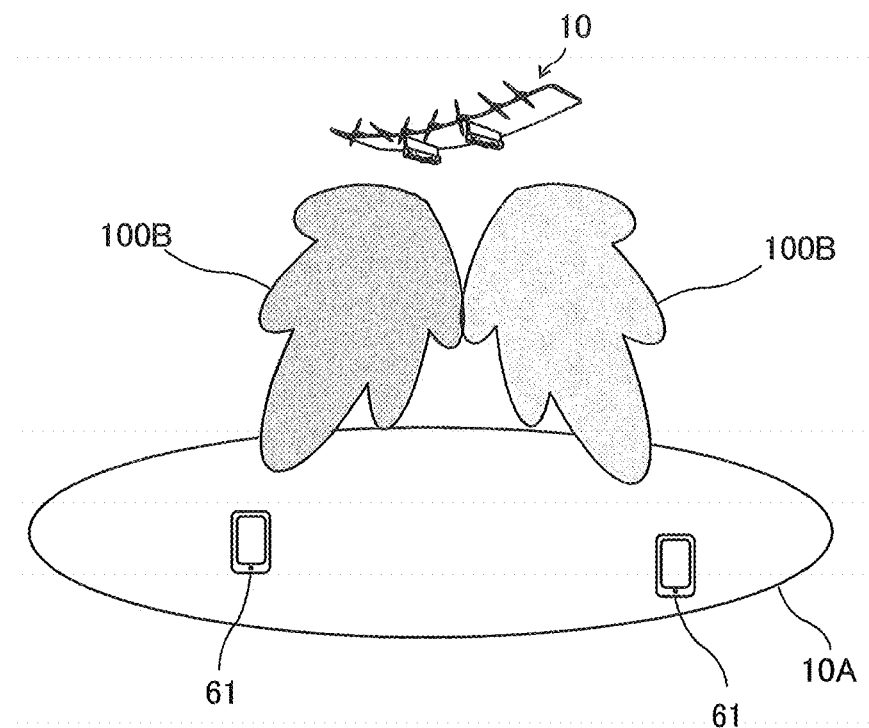
FIG. 20 is an illustration showing an example of a first BF method used for calculating the BF weights in FIG. 19.
Figure 21:
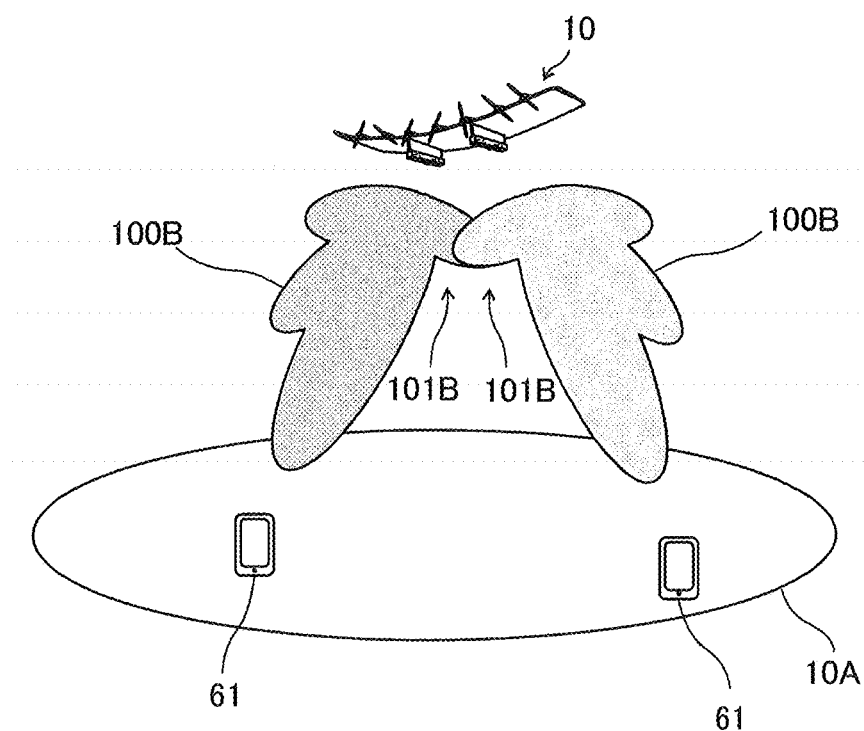
FIG. 21 is an illustration showing an example of a second BF method used for calculating the BF weights in FIG. 19.
Figure 22:
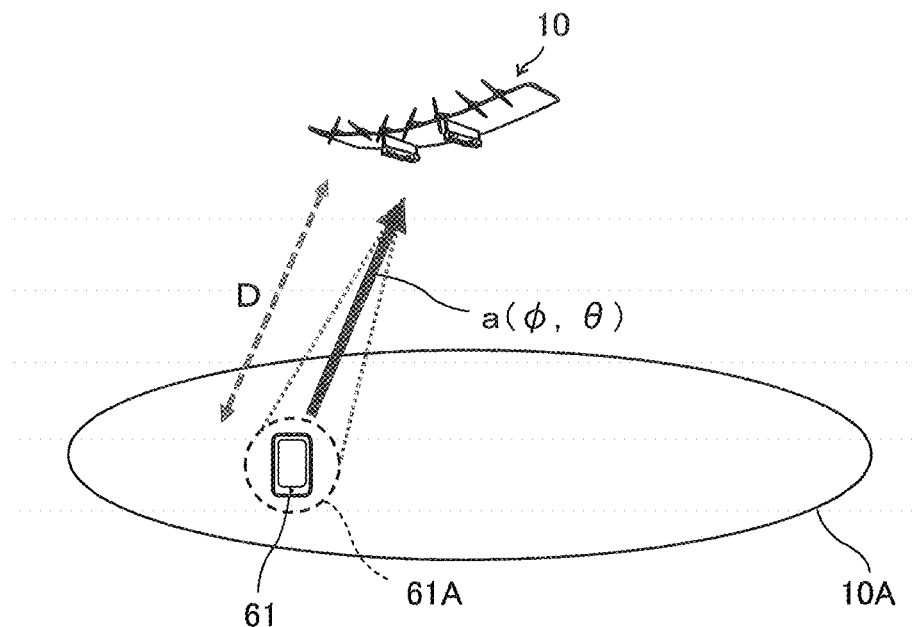
FIG. 22 is an illustration showing an example of a mode vector in the calculation of the BF weights in the case of the second BF method of FIG. 21.

FIG. 19 is a flowchart showing an example of BF weight calculation based on angle information (azimuth angle, elevation angle) in FIG. 11. FIG. 20 is an illustration showing an example of the first BF method used for calculating BF weights in FIG. 19. FIG. 21 is an illustration showing an example of the second BF method used for calculating BF weights in FIG. 19. FIG. 22 is an illustration showing an example of mode vectors in the BF weight calculation in the case of the second BF method of FIG. 21. It is noted that FIG. 19 shows a BF weight calculation process for one certain radio resource (1 RB) for simplification of explanation.

In FIG. 19, first, the relay communication station 110 of the HAPS 10 obtains angle information (azimuth angle φ, elevation angle θ) on all UEs 61 assigned to the target RB (S121).

Next, the relay communication station 110 of the HAPS 10 determines the type of beam forming method (BF method) used for the downlink communication (S122 in FIG. 19), and in the case of the first BF method (BF method 1), calculates the beam steering weight (BF weight) exemplified in FIG. 20 based on the foregoing obtained angle information (azimuth angle φ, elevation angle θ) (S123 in FIG. 19). In the case of this first BF method (BF method 1), the amount of computation for calculating the BF weight is smaller than in the case of the following second BF method (BF method 2). It is noted that, in the case of this first BF method (BF method 1), although it is a simple calculation method without considering interference between the UEs (inter-beam interference) and the like, the interference between the UEs (inter-beam interference) is less likely to occur, because the plural UEs 61 assigned to the RB have a low spatial correlation with each other as described above.

In the case of the second BF method (BF method 2), the relay communication station 110 of the HAPS 10 estimates (restores) the CSI of each UE 61 (channel state information between the HAPS 10 and the UE 61) based on the foregoing obtained angle information (azimuth angle φ, elevation angle θ) (S124 in FIG. 19), and calculates the beam steering weight (BF weight) exemplified in FIG. 21 based on the estimated (restored) CSI of each UE 61 (S125 in FIG. 19). In the case of this second BF method (BF method 2), since the BF weights are calculated based on the CSI estimation results (restoration results), an arbitrary general BF algorithm based on the CSI can be used to calculate the BF weights, and the accuracy of beamforming is higher than that of the first BF method (BF method 1) described above, and more advanced beamforming control is possible. For example, in case that the Zero-Forcing is used as the BF algorithm, the directivity of the mutually adjacent sections 101B of the beam 100B directed to each UE becomes null and there is no interference as exemplified in FIG. 21, and the inter-UE interference becomes zero.

Next, the relay communication station 110 of the HAPS 10 sends the calculation result of the BF weight used for the downlink MU-MIMO communication with each UE 61, to the BF multiplication section described below (S126 in FIG. 19).

FIG. 22 is an illustration showing an example of a mode vector used for the CSI estimation (restoration) in the BF weight calculation in the case of the second BF method (BF method 2) in FIG. 21. As described above, in the case of the HAPS system, the scattering area 61A of the UE 61 due to multipath is narrow with respect to the propagation distance D of radio waves, and the expected angle θp of the scattering area 61A viewed from the array antenna of the HAPS 10 is small. Therefore, for example, as shown in FIG. 22, the radio wave from the UE 61 to the HAPS 10 can be regarded as a set of direct waves including the reflected waves, without distinguishing between the direct waves and the multipath reflected waves. So, the mode vector a (φ, θ) for the array antenna of the HAPS 10 in the figure can be substituted for the CSI.

Herein, when the azimuth angle and elevation angle of the UE 61 viewed from the array antenna of the HAPS 10 are φ and θ, respectively, and the total number of plural antenna elements constituting the array antenna of the HAPS 10 is Nt, an amplitude response vector g (φ, θ) and a phase-difference response vector d (φ, θ) consisting of 1×Nt elements for the plural antenna elements are expressed by the following equations (1) and (2), respectively.

$$g(\phi,\theta)=[g_1(\phi,\theta),\ldots,g_{N_t}(\phi,\theta)] \quad (1)$$

$$d(\phi,\theta)=[d_1(\phi,\theta),\ldots,d_{N_t}(\phi,\theta)] \quad (2)$$

$g_i(\phi,\theta)$ in the equation (1) is the amplitude response function of the i-th antenna element, and $d_i(\phi,\theta)$ in the equation (2) is the phase-difference response function of the i-th antenna element.

Using the amplitude response vector g (φ, θ) of the equation (1) and the phase-difference response vector d (φ, θ) of the equation (2), the mode vector a (φ, θ) consisting of 1×Nt elements, which can be substituted for the CSI, can be calculated by the following equation (3).

$$a(\phi,\theta)=g(\phi,\theta)\odot d(\phi,\theta) \quad (3)$$

$\odot$ in the equation (3) is the Hadamard product operator. It is noted that the CSI estimated (restored) by calculating the mode vector a (φ, θ) of the equation (3) does not include the influence of the propagation pass loss (path loss).

In case that the array antenna 130 of the HAPS 10 is the above-described cylindrical array antenna 130 in FIG. 5, the mode vector a (φ, θ), which can be substituted for the CSI, can be calculated as follows.

Figure 23:
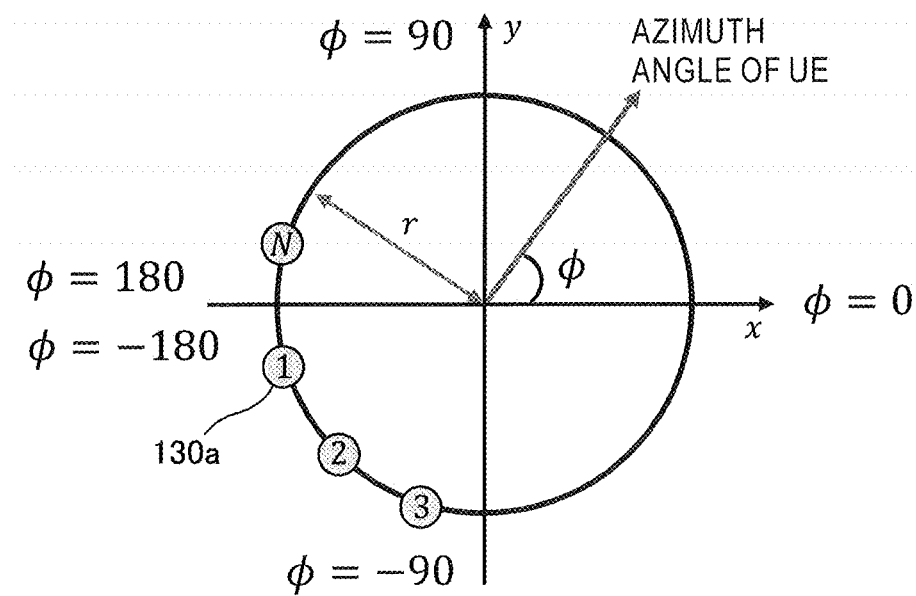
FIG. 23 is an illustration showing an example of coordinates of a virtual horizontal plane, placement of the antenna elements, and azimuth angles of UEs in a CSI estimation (restoration) in the case of a cylindrical array antenna.

FIG. 23 is an illustration showing an example of the coordinates of the virtual horizontal plane, the placements of the antenna elements 130a and the azimuth angle φ of the UE 61 in the CSI estimation (restoration) in the case of the cylindrical array antenna. A phase-difference response vector $d_H$ (φ) in the horizontal direction (azimuth angle direction) along the virtual horizontal plane in FIG. 23 is expressed by the following equations (4) and (5). In the equation, N is the number of antenna elements (number of horizontal elements) in the virtual horizontal plane, and r is the radius of the cylindrical antenna base (radius of the circle in which the antenna elements are disposed). Equation (5) is the phase-difference response function of the n-th antenna element in the virtual horizontal plane. In equation (5), j expresses the imaginary unit, π expresses the circular constant, and λ expresses the wavelength of the carrier wave.

$$d_H(\phi) = [d_{H,1}(\phi), d_{H,2}(\phi), \ldots, d_{H,N}(\phi)] \quad (4)$$

$$d_{H,n}(\phi) = \exp\left(j\frac{2\pi}{\lambda}r\cos\left(\phi - \frac{2\pi(n-1)}{N}\right)\right) \quad (5)$$

Figure 24:
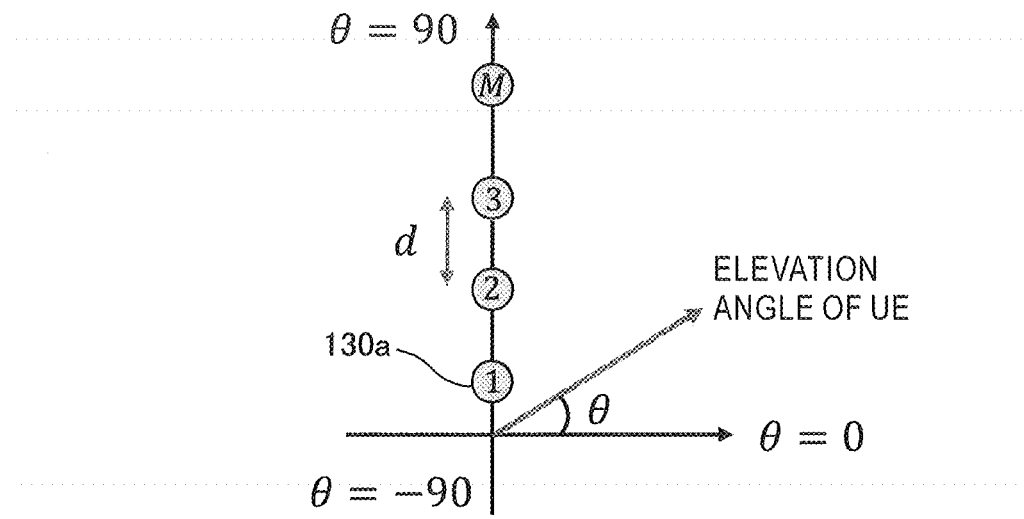
FIG. 24 is an illustration showing an example of coordinates of a virtual vertical plane, placement of the antenna elements, and elevation angles of UEs in a CSI estimation (restoration) in the case of a cylindrical array antenna.

FIG. 24 is an illustration showing an example of the coordinates of the virtual vertical plane, the placements of the antenna elements 130a and the elevation angle θ of the UE 61 in the CSI estimation (restoration) in the case of the cylindrical array antenna. A phase-difference response vector $d_V$ (θ) in the vertical direction (elevation angle direction) along the virtual vertical plane in FIG. 24 is expressed by the following equations (6) and (7). In the equation, M is the number of antenna elements (the number of vertical elements) in the virtual vertical plane, and d is the interval between the antenna elements (element interval). Equation (7) is a phase-difference response function of the m-th antenna element in the virtual vertical plane. In equation (7), j expresses the imaginary unit, π expresses the circular constant, and λ expresses the wavelength of the carrier wave.

$$d_V(\theta) = [d_{V,1}(\theta), d_{V,2}(\theta), \ldots, d_{V,M}(\theta)] \quad (6)$$

$$d_{V,m}(\theta) = \exp\left(-j\frac{2\pi}{\lambda}(m-1)d\sin\theta\right) \quad (7)$$

Using the phase-difference response vector $d_H$ (φ) of equation (4) in the virtual horizontal plane and the phase-difference response vector $d_V$ (θ) of equation (6) in the virtual vertical plane, a phase-difference response vector d (φ, θ) for all antenna elements consisting of the cylindrical array antenna is expressed by the following equation (8).

$$d(\phi,\theta)=d_V(\theta)\otimes d_H(\phi) \quad (8)$$

$\otimes$ in the equation (8) is the Kronecker product operator.

Based on the above-described amplitude response vector g (φ, θ) of the equation (1) and the phase-difference response vector d (φ, θ) of the equation (8), the mode vector a (φ, θ) that can be substituted for the CSI can be calculated as shown in the above-described equation (3).

Figure 25:
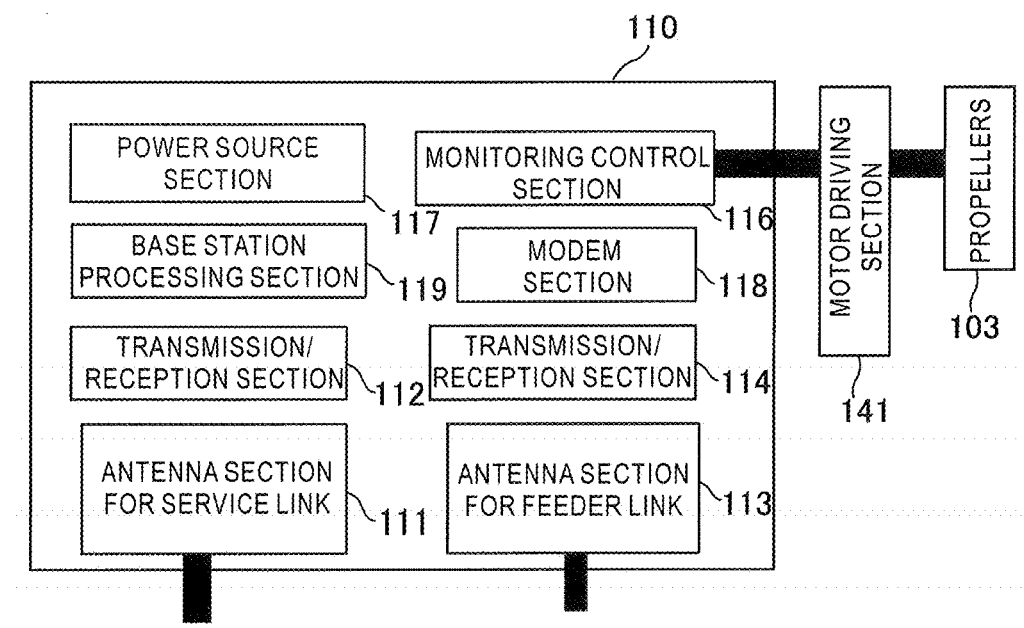
FIG. 25 is a block diagram showing an example of a main configuration of a relay communication station of a HAPS of an embodiment.

FIG. 25 is a block diagram showing an example of a main configuration of the relay communication station 110 of the HAPS 10 of the embodiment. The relay communication station 110 in FIG. 25 is an example of a base-station type relay communication station. The relay communication station 110 is provided with an antenna section for service link 111, a transmission/reception section 112, an antenna section for feeder link 113, a transmission/reception section 114, a monitor control section 116, a power supply section 117, a modem section 118, and a base-station processing section 119.

The antenna section for service link 111 has an array antenna that forms a radial beam toward the ground (or the sea), and forms a three-dimensional cell 100C that can communicate with the UE 61. The transmission/reception section 112 constitutes a first-radio communication section together with the antenna section for service link 111, has a duplexer (DUP: DUPlexer) and an amplifier, etc., and transmits radio signals to the UE 61 located in the three-dimensional cell 100C and receives radio signals from the UE 61 via the antenna section for service link 111.

The antenna section for service link 111 and the transmission/reception section 112 also function as an uplink (UL) reception section that receives an uplink signal capable of identifying the UE 61 from each of the plural UEs 61 via the array antenna 130.

The antenna section for feeder link 113 has a directional antenna for radio communication with the feeder station 70 on the ground (or on the sea). The transmission/reception section 114 constitutes a second-radio communication section together with the antenna section for feeder link 113, has a duplexer (DUP: DUPlexer) and an amplifier, etc., and transmits radio signals to the feeder station 70 and receives radio signals from the feeder station 70 via the antenna section for feeder link 113.

The monitoring control section 116 is composed of, for example, a CPU and a memory, etc., and monitors the operation processing status of each section in the HAPS 10 and controls each section by executing a preinstalled program. In particular, the monitoring control section 116 controls the motor driving section 141 that drives the propellers 103 and 202 to move the HAPS 10 to the target position and to keep it near the target position by executing a control program.

The power supply section 117 supplies electric power output from the batteries 106 and 204 to each section in the HAPS 10. The power supply section 117 may have a function of storing electric power generated by the photovoltaic panel, etc., or electric power supplied from the outside in the batteries 106 and 204.

The modem section 118, for example, performs demodulation process and decoding process on reception signals received from the feeder station 70 via the antenna section for feeder link 113 and the transmission/reception section 114, and generates data signals to be output to the base-station processing section 119 side.

The modem section 118 performs encoding process and modulation process on data signals received from the base-station processing section 119 side, and generates transmission signals to be transmitted to the feeder station 70 via the antenna section for feeder link 113 and the transmission/reception section 114.

The base-station processing section 119 has, for example, a function (for example, functions of e-NodeB, g-NodeB, etc.) that performs base band process based on the method that conforms to the LTE/LTE-AdVanced standard or the next-generation standard such as the 5th generation.

The base-station processing section 119, for example, performs demodulation process and decoding process on reception signals received from the UE 61 located in the three-dimensional cell 100C via the antenna section for service link 111 and the transmission/reception section 112, and generates data signals to be output to the modem section 118 side. The base-station processing section 119 performs encoding process and modulation process on data signals received from the modem section 118 side, and generates base band signals (IQ signals) to be transmitted to the UE 61 of the three-dimensional cell 100C via the antenna section for service link 111 and the transmission/reception section 112.

Figure 26:
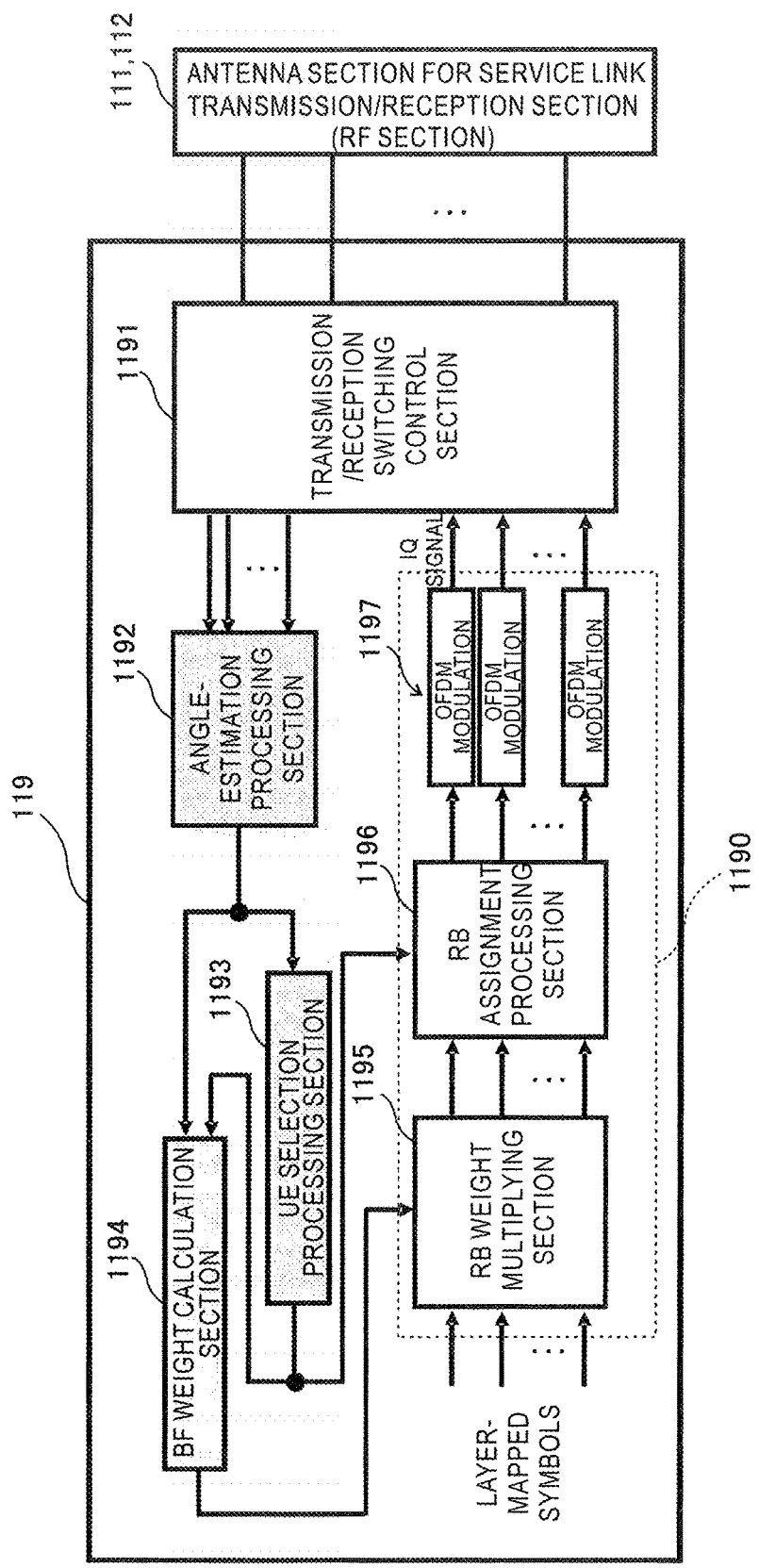
FIG. 26 is a block diagram showing an example of a main configuration of a base-station processing section in the relay communication station of FIG. 25.

FIG. 26 is a block diagram showing an example of a main configuration of the base-station processing section 119 in the relay communication station 110 of FIG. 25. In FIG. 26, only the main configuration related to the present embodiment is illustrated, and illustration of other components necessary for communication with the UE 61 is omitted.

In FIG. 26, the base-station processing section 119 is provided with a downlink (DL) transmission section 1190, a transmission/reception switching control section 1191, an angle-estimation processing section 1192, a UE selection processing section (user-selection processing section) 1193, a BF weight calculation section 1194, a BF weight multiplying section 1195, an RB assignment processing section 1196, and an OFDM modulation section 1197. The DL transmission section 1190 has the BF weight multiplying section 1195, the RB assignment processing section 1196, and plural OFDM modulation sections 1197, and performs transmission signal processing by plural layers (streams) in downlink MU-MIMO communication.

The transmission/reception switching control section 1191 passes uplink signals from plural antenna elements received from each UE 61 in the cell 100C by the antenna section for service link 111 and the transmission/reception section 112, to the angle-estimation processing section 1192. The transmission/reception switching control section 1191 passes a transmission signal (IQ signal) for each of plural layers (streams) simultaneously generated by the DL transmission section 1190, to the transmission/reception section 112.

The angle-estimation processing section 1192 estimates angle information (azimuth angle $\varphi$, elevation angle $\theta$) indicating the direction of each UE 61 with reference to the position of the array antenna 130 based on an arbitrary uplink signal capable of identifying the UE received from each of all the UEs 61 in the cell 100C, as exemplified in FIG. 12 described above.

The UE selection processing section (user-selection processing section) 1193 selects UE 61 to be assigned to the RE for each of plural time-frequency resource blocks (RBs) used for the downlink MU-MIMO communication, based on the angle information (azimuth angle $\varphi$, elevation angle $\theta$) of all the UEs 61 targeted for performing downlink MU-MIMO communication, as exemplified in FIG. 14 described above. Selection information on the UE 61 assigned to each RE is sent to the RB assignment processing section 1196.

The BF weight calculating section 1194 calculates BF weights for beam steering (beamforming control) that are multiplied by symbols when transmitting transmission signals of each UE, with respect to each of all UEs 61 targeted for performing the downlink MU-MIMO communication, based on the angle information (azimuth angle $\varphi$, elevation angle $\theta$) on the UE 61, as exemplified in FIG. 19 described above. The BF weight calculation result of each UE 61 is sent to the BF weight multiplying section 1195.

The BF weight multiplying section 1195 multiplies each of symbols for the UE 61 mapped to a predetermined number of layers (transmission streams) by the BF weight corresponding to the UE 61, with respect to each of all UEs 61 targeted for performing the downlink MU-MIMO communication, based on the BF weight calculation result received from the BF weight calculating section 1194.

The RB assignment processing section 1196 assigns the symbol of the UE 61 multiplied by the BF weight to the RB corresponding to the UE 61, with respect to each of all UEs 61 targeted for performing the downlink MU-MIMO communication, based on the UE (user) selection information received from the UE selection processing section (user-selection processing section) 1193.

The plural OFDM modulation sections 1197 perform OFDM modulation on each of plural symbols mapped to a predetermined number of layers (transmission streams) of downlink MU-MIMO communication to generate plural IQ signals, and output them to the transmission/reception switching control section 1191.

As described above, according to the present embodiment, in the case of performing the MU-MIMO communication using the multi-element array antenna between the relay communication station 110 of the HAPS 10 in the upper airspace and plural UEs 61 in the cell 100C, it is possible to improve the communication quality of the entire cell 100C and enhance the system capacity while suppressing an increase in overhead in the UEs 61 and the relay communication station 110 even if the number of UEs 61 located in the cell 100C increases.

It is noted that, the process steps and configuration elements of the relay communication station of the communication relay apparatus such as the HAPS 10, the feeder station, the gateway station, the management apparatus, the monitoring apparatus, the remote control apparatus, the server, the terminal apparatus (UE: user equipment, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, gateway station, base station, base station apparatus, relay-communication station apparatus, terminal apparatus (UE: user equipment, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: HAPS
10A: service area
61: terminal apparatus (UE)
61A: scattering area
70: feeder station (GW station)
71: antenna
80: mobile communication network
100A: service area
100B: beam
100C: cell
100F: footprint
110: relay communication station
111: antenna section for service link
112: transmission/reception section
113: antenna section for feeder link
114: transmission/reception section
119: base-station processing section
130: array antenna
130a: antenna element
1190: downlink transmission section
1191: transmission/reception switching control section
1192: angle-estimation processing section
1194: BF weight calculation section
1195: BF weight multiplying section
1196: assignment processing section
1197: OFDM modulation section

The invention claimed is:

1. An upper-airspace staying type communication relay apparatus that forms a cell toward the ground or the sea and performs an MU-MIMO radio communication with plural terminal apparatuses located in the cell, comprising:

an array antenna having plural antenna elements, the array antenna forming a cell for performing radio communications of service link to and from the plural terminal apparatuses;

an uplink reception section for receiving an uplink signal capable of identifying the terminal apparatus, from each of the plural terminal apparatuses via the array antenna;

an angle-estimation processing section for estimating angle information indicating a direction of the terminal apparatus with reference to a position of the array antenna for each of the plural terminal apparatuses;

a selection processing section for selecting a terminal apparatus to be assigned to each of plural radio resources used for a downlink of the service link so that a same radio resource is assigned to the plural terminal apparatuses separated from each other by the angle, based on the estimation result of the angle information on the plural terminal apparatuses;

a weight calculation section for calculating a downlink beamforming weight for the terminal apparatus by the array antenna based on the estimation result of the angle information, with respect to each of the plural terminal apparatuses; and a downlink transmission section for transmitting a downlink signal to the terminal apparatus via the array antenna based on the beamforming weight corresponding to the terminal apparatus and the radio resource assigned to the terminal apparatus, with respect to each of the plural terminal apparatuses, wherein the angle information is information on an elevation angle and an azimuth angle of the direction of the terminal apparatus with reference to the position of the array antenna, wherein the selection processing section:
rearranges the plural terminal apparatuses located in the cell with respect to the elevation angle and divides them into plural elevation angle groups;
rearranges the plural terminal apparatuses belonging to the elevation angle group with respect to the azimuth angle, with respect to each of the plural elevation angle groups; and
performs the selection of the terminal apparatuses so that the same radio resource is assigned to plural terminal apparatuses separated from each other on a virtual plane having coordinate axes of the elevation angle and the azimuth angle, the coordinate axes intersecting each other; and wherein the weight calculation section calculates the beamforming weight according to the angle information, with respect to each of the plural terminal apparatuses.

2. An upper-airspace staying type communication relay apparatus that forms a cell toward the ground or the sea and performs an MU-MIMO radio communication with plural terminal apparatuses located in the cell, comprising:

an array antenna having plural antenna elements, the array antenna forming a cell for performing radio communications of service link to and from the plural terminal apparatuses;

an uplink reception section for receiving an uplink signal capable of identifying the terminal apparatus, from each of the plural terminal apparatuses via the array antenna;

an angle-estimation processing section for estimating angle information indicating a direction of the terminal apparatus with reference to a position of the array antenna for each of the plural terminal apparatuses;

a selection processing section for selecting a terminal apparatus to be assigned to each of plural radio resources used for a downlink of the service link so that a same radio resource is assigned to the plural terminal apparatuses separated from each other by the angle, based on the estimation result of the angle information on the plural terminal apparatuses;

a weight calculation section for calculating a downlink beamforming weight for the terminal apparatus by the array antenna based on the estimation result of the angle information, with respect to each of the plural terminal apparatuses; and a downlink transmission section for transmitting a downlink signal to the terminal apparatus via the array antenna based on the beamforming weight corresponding to the terminal apparatus and the radio resource assigned to the terminal apparatus, with respect to each of the plural terminal apparatuses, wherein the angle information is information on an elevation angle and an azimuth angle of the direction of the terminal apparatus with reference to the position of the array antenna, wherein the selection processing section:
rearranges the plural terminal apparatuses located in the cell with respect to the elevation angle and divides them into plural elevation angle groups;
rearranges the plural terminal apparatuses belonging to the elevation angle group with respect to the azimuth angle, with respect to each of the plural elevation angle groups; and
performs the selection of the terminal apparatuses so that the same radio resource is assigned to plural terminal apparatuses separated from each other on a virtual plane having coordinate axes of the elevation angle and the azimuth angle, the coordinate axes intersecting each other; and wherein the weight calculation section estimates channel state information or information equivalent thereto between the terminal apparatus and the communication relay apparatus based on the angle information, and calculates the beamforming weight based on the estimation result, with respect to each of the plural terminal apparatuses.

3. A non-transitory computer readable medium containing software that is executed by a computer or a processor installed in an upper-airspace staying type communication relay apparatus that forms a cell toward the ground or the sea and performs an MU-MIMO radio communication with plural terminal apparatuses located in the cell; the software comprising:

executable code that receives an uplink signal capable of identifying the terminal apparatus from each of the plural terminal apparatuses via an array antenna having plural antenna elements forming a cell for performing radio communications of service link to and from the plural terminal apparatuses;

executable code that estimates angle information indicating a direction of the terminal apparatus with reference to a position of the array antenna, with respect to each of the plural terminal apparatuses;

executable code that selects a terminal apparatus to be assigned to each of plural radio resources used for a downlink of the service link so that a same radio resource is assigned to the plural terminal apparatuses separated from each other by the angle, based on the estimation results of the angle information of the plural terminal apparatuses;

executable code that calculates a downlink beamforming weight for the terminal apparatus by the array antenna based on the estimation result of the angle information, with respect to each of the plural terminal apparatuses; and executable code that transmits a downlink signal to the terminal apparatus via the array antenna based on the beamforming weight corresponding to the terminal apparatus and the radio resource assigned to the terminal apparatus, with respect to each of the plural terminal apparatuses, wherein the angle information is information on an elevation angle and an azimuth angle of the direction of the terminal apparatus with reference to the position of the array antenna, and wherein the software further comprises:

executable code that rearranges the plural terminal apparatuses located in the cell with respect to the elevation angle and divides them into plural elevation angle groups;

executable code that rearranges the plural terminal apparatuses belonging to the elevation angle group with respect to the azimuth angle, with respect to each of the plural elevation angle groups;

executable code that performs the selection of the terminal apparatuses so that the same radio resource is assigned to plural terminal apparatuses separated from each other on a virtual plane having coordinate axes of the elevation angle and the azimuth angle, the coordinate axes intersecting each other; and executable code that calculates the beamforming weight according to the angle information, with respect to each of the plural terminal apparatuses.

4. The communication relay apparatus according to claim 2, wherein communication relay apparatus substitutes a mode vector consisting of a Hadamard product of an amplitude response vector of the plural antenna elements of the array antenna and a phase difference vector between the antenna elements of the plural antenna elements, as the channel state information.

5. A system comprising the communication relay apparatus according to claim 1; and a terminal apparatus for performing an MU-MIMO radio communication with the communication relay apparatus.

6. A system comprising the communication relay apparatus according to claim 2; and a terminal apparatus for performing an MU-MIMO radio communication with the communication relay apparatus.

7. A system comprising the communication relay apparatus according to claim 4; and a terminal apparatus for performing an MU-MIMO radio communication with the communication relay apparatus.

8. A non-transitory computer readable medium containing software that is executed by a computer or a processor installed in an upper-airspace staying type communication relay apparatus that forms a cell toward the ground or the sea and performs an MU-MIMO radio communication with plural terminal apparatuses located in the cell; the software comprising:

executable code that receives an uplink signal capable of identifying the terminal apparatus from each of the plural terminal apparatuses via an array antenna having plural antenna elements forming a cell for performing radio communications of service link to and from the plural terminal apparatuses;

executable code that estimates angle information indicating a direction of the terminal apparatus with reference to a position of the array antenna, with respect to each of the plural terminal apparatuses;

executable code that selects a terminal apparatus to be assigned to each of plural radio resources used for a downlink of the service link so that a same radio resource is assigned to the plural terminal apparatuses separated from each other by the angle, based on the estimation results of the angle information of the plural terminal apparatuses;

executable code that calculates a downlink beamforming weight for the terminal apparatus by the array antenna based on the estimation result of the angle information, with respect to each of the plural terminal apparatuses; and executable code that transmits a downlink signal to the terminal apparatus via the array antenna based on the beamforming weight corresponding to the terminal apparatus and the radio resource assigned to the terminal apparatus, with respect to each of the plural terminal apparatuses, wherein the angle information is information on an elevation angle and an azimuth angle of the direction of the terminal apparatus with reference to the position of the array antenna, and wherein the software further comprises:

executable code that rearranges the plural terminal apparatuses located in the cell with respect to the elevation angle and divides them into plural elevation angle groups;

executable code that rearranges the plural terminal apparatuses belonging to the elevation angle group with respect to the azimuth angle, with respect to each of the plural elevation angle groups;

executable code that performs the selection of the terminal apparatuses so that the same radio resource is assigned to plural terminal apparatuses separated from each other on a virtual plane having coordinate axes of the elevation angle and the azimuth angle, the coordinate axes intersecting each other; and executable code that estimates channel state information or information equivalent thereto between the terminal apparatus and the communication relay apparatus based on the angle information, and calculates the beamforming weight based on the estimation result, with respect to each of the plural terminal apparatuses.

* * * * *